US012783114B2

(12) United States Patent
Chao et al.

(10) Patent No.: US 12,783,114 B2
(45) Date of Patent: Nov. 3, 2026

(54) USER INTERFACES FOR DEVICE CHARGING

(71) Applicant: Apple Inc., Cupertino, CA (US)

(72) Inventors: Edward Chao, Palo Alto, CA (US); Patrick L Coffman, San Francisco, CA (US); Cyril De La Cropte De Chanterac, San Francisco, CA (US); Kevin M. Lynch, Woodside, CA (US); Conor J. O'Reilly, Los Gatos, CA (US); Michael S. Soetaert, San Jose, CA (US); Kartik R. Venkatraman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 18/241,793

(22) Filed: Sep. 1, 2023

(65) Prior Publication Data

US 2024/0078002 A1 Mar. 7, 2024

Related U.S. Application Data

(60) Provisional application No. 63/403,244, filed on Sep. 1, 2022.

(51) Int. Cl.

| | |
|---|---|
| ***G06F 3/04847*** | (2022.01) |
| ***G06F 1/26*** | (2006.01) |
| ***H02J 7/82*** | (2026.01) |
| *G06F 3/04842* | (2022.01) |

(52) U.S. Cl.

CPC ............ *G06F 3/04847* (2013.01); *G06F 1/26* (2013.01); *H02J 7/82* (2026.01); *G06F 3/04842* (2013.01)

(58) Field of Classification Search

CPC . G06F 1/32; G06F 1/26; G06F 1/3212; G06F 11/30; G06F 9/30; G06F 3/04842; G06F 9/48; G06F 3/04847

See application file for complete search history.

(56) References Cited

U.S. PATENT DOCUMENTS

| | | | |
|---|---|---|---|
| 6,124,700 | A | 9/2000 | Nagai et al. |
| 6,323,846 | B1 | 11/2001 | Westerman et al. |
| 6,414,466 | B1 | 7/2002 | Ida |
| 6,570,557 | B1 | 5/2003 | Westerman et al. |
| 6,677,932 | B1 | 1/2004 | Westerman |
| 6,809,724 | B1 | 10/2004 | Shiraishi et al. |
| 7,574,661 | B2 | 8/2009 | Matsuura et al. |
| 7,657,849 | B2 | 2/2010 | Chaudhri et al. |
| 8,768,419 | B2 | 7/2014 | Sivaraman et al. |
| 8,774,868 | B2 | 7/2014 | Niu et al. |
| 8,903,456 | B2 | 12/2014 | Chu et al. |

(Continued)

FOREIGN PATENT DOCUMENTS

| | | | |
|---|---|---|---|
| AU | 2016219716 | A1 | 9/2016 |
| CN | 1165592 | A | 11/1997 |

(Continued)

OTHER PUBLICATIONS

Applicant-Initiated Interview Summary received for U.S. Appl. No. 18/671,786, mailed on Feb. 3, 2025, 2 pages.

(Continued)

*Primary Examiner* — Rayeez R Chowdhury
(74) *Attorney, Agent, or Firm* — YHE Law LLP

(57) ABSTRACT

The present disclosure generally relates to methods for managing charging of an electronic device.

55 Claims, 19 Drawing Sheets

(56) References Cited

U.S. PATENT DOCUMENTS

| | | | |
|---|---|---|---|
| 9,075,612 | B2 | 7/2015 | Yang et al. |
| 9,268,387 | B2 | 2/2016 | Yu |
| 9,477,283 | B2 | 10/2016 | Gerber et al. |
| 9,606,706 | B2 | 3/2017 | Vyas et al. |
| 9,954,991 | B2 | 4/2018 | Wang et al. |
| 10,027,153 | B2 | 7/2018 | Toya et al. |
| 10,073,998 | B1 * | 9/2018 | Tran .................... H02J 50/001 |
| 10,416,745 | B2 | 9/2019 | Vyas et al. |
| 2002/0015024 | A1 | 2/2002 | Westerman et al. |
| 2004/0070511 | A1 * | 4/2004 | Kim .................... H04M 1/724 340/636.1 |
| 2004/0236975 | A1 | 11/2004 | Gaskins et al. |
| 2005/0066209 | A1 | 3/2005 | Kee et al. |
| 2005/0190059 | A1 | 9/2005 | Wehrenberg |
| 2006/0017692 | A1 | 1/2006 | Wehrenberg et al. |
| 2008/0079589 | A1 | 4/2008 | Blackadar |
| 2008/0238358 | A1 * | 10/2008 | Koide .................. H02J 7/0036 320/106 |
| 2008/0258679 | A1 * | 10/2008 | Manico ................ G06F 1/1632 320/106 |
| 2009/0098914 | A1 * | 4/2009 | Martin-Cocher .......................... H04W 52/0264 307/130 |
| 2009/0146608 | A1 | 6/2009 | Lee |
| 2009/0156268 | A1 | 6/2009 | Kim et al. |
| 2009/0164152 | A1 * | 6/2009 | Creus ............... H04W 52/0258 702/63 |
| 2009/0168088 | A1 | 7/2009 | Rosenblatt |
| 2009/0287433 | A1 | 11/2009 | Houston et al. |
| 2009/0307511 | A1 | 12/2009 | Fiennes et al. |
| 2010/0188041 | A1 | 7/2010 | Mizuo |
| 2010/0201533 | A1 | 8/2010 | Kirby et al. |
| 2010/0214107 | A1 * | 8/2010 | Montebovi ........... H02J 7/0042 340/636.1 |
| 2010/0317408 | A1 | 12/2010 | Ferren et al. |
| 2011/0001457 | A1 | 1/2011 | Mueller |
| 2011/0009172 | A1 | 1/2011 | Song et al. |
| 2011/0059769 | A1 | 3/2011 | Brunolli |
| 2011/0071780 | A1 | 3/2011 | Tarkoma |
| 2011/0175576 | A1 | 7/2011 | Uesaka et al. |
| 2011/0279078 | A1 * | 11/2011 | Hara ...................... H02J 7/02 320/162 |
| 2011/0301890 | A1 | 12/2011 | Shirriff et al. |
| 2011/0314319 | A1 | 12/2011 | Kurahashi |
| 2011/0316769 | A1 | 12/2011 | Boettcher et al. |
| 2012/0001592 | A1 | 1/2012 | Fukaya |
| 2012/0015695 | A1 | 1/2012 | Hackborn et al. |
| 2012/0043821 | A1 | 2/2012 | Lee et al. |
| 2012/0047380 | A1 | 2/2012 | Nurmi |
| 2012/0071149 | A1 | 3/2012 | Bandyopadhyay et al. |
| 2012/0112539 | A1 | 5/2012 | Yamamoto |
| 2012/0115549 | A1 | 5/2012 | Kim et al. |
| 2012/0154303 | A1 | 6/2012 | Lazaridis et al. |
| 2012/0239949 | A1 | 9/2012 | Kalyanasundaram et al. |
| 2012/0272230 | A1 | 10/2012 | Lee |
| 2012/0317432 | A1 | 12/2012 | Assad et al. |
| 2013/0049704 | A1 * | 2/2013 | Andou .................. G06F 1/263 320/162 |
| 2013/0088411 | A1 | 4/2013 | Reeves et al. |
| 2013/0111579 | A1 | 5/2013 | Newman et al. |
| 2013/0130745 | A1 | 5/2013 | Niu et al. |
| 2013/0138989 | A1 | 5/2013 | Jang et al. |
| 2013/0169219 | A1 | 7/2013 | Gray |
| 2013/0244633 | A1 | 9/2013 | Jacobs et al. |
| 2013/0332749 | A1 | 12/2013 | Kida et al. |
| 2013/0339772 | A1 | 12/2013 | Yu |
| 2013/0339884 | A1 | 12/2013 | Wilson et al. |
| 2014/0015478 | A1 | 1/2014 | Von Novak |
| 2014/0068306 | A1 | 3/2014 | Oh et al. |
| 2014/0068314 | A1 | 3/2014 | Kim et al. |
| 2014/0089842 | A1 | 3/2014 | Lin et al. |
| 2014/0117921 | A1 | 5/2014 | Suomela |
| 2014/0239733 | A1 | 8/2014 | Mach et al. |
| 2014/0278166 | A1 | 9/2014 | Takahashi |
| 2014/0287724 | A1 | 9/2014 | Takenouchi et al. |
| 2014/0312829 | A1 | 10/2014 | Ha et al. |
| 2014/0313867 | A1 | 10/2014 | Lee et al. |
| 2014/0330764 | A1 | 11/2014 | Rhines et al. |
| 2014/0364173 | A1 | 12/2014 | Tuli |
| 2015/0007049 | A1 | 1/2015 | Langlois |
| 2015/0062052 | A1 | 3/2015 | Bernstein et al. |
| 2015/0069969 | A1 * | 3/2015 | Wu ........................ H02J 50/10 320/109 |
| 2015/0102992 | A1 | 4/2015 | Klement et al. |
| 2015/0133076 | A1 | 5/2015 | Brough |
| 2015/0156307 | A1 | 6/2015 | Kim et al. |
| 2015/0185849 | A1 | 7/2015 | Ramsay et al. |
| 2015/0263548 | A1 | 9/2015 | Cooper et al. |
| 2015/0277559 | A1 | 10/2015 | Vescovi et al. |
| 2015/0346933 | A1 | 12/2015 | Vyas et al. |
| 2015/0350129 | A1 | 12/2015 | Cary et al. |
| 2015/0351004 | A1 | 12/2015 | Ko et al. |
| 2016/0013678 | A1 | 1/2016 | Bell et al. |
| 2016/0041597 | A1 | 2/2016 | Graham et al. |
| 2016/0062540 | A1 | 3/2016 | Yang et al. |
| 2016/0064958 | A1 | 3/2016 | Jung et al. |
| 2016/0072317 | A1 | 3/2016 | Guz et al. |
| 2016/0073351 | A1 | 3/2016 | Cardozo et al. |
| 2016/0190861 | A1 | 6/2016 | Cha |
| 2016/0191357 | A1 | 6/2016 | Orner et al. |
| 2016/0209906 | A1 | 7/2016 | Chae et al. |
| 2016/0259535 | A1 | 9/2016 | Fleizach et al. |
| 2016/0301791 | A1 | 10/2016 | Kim et al. |
| 2016/0380464 | A1 | 12/2016 | Chin et al. |
| 2017/0012446 | A1 | 1/2017 | Lim et al. |
| 2017/0047765 | A1 | 2/2017 | Jung et al. |
| 2017/0093079 | A1 | 3/2017 | Wagman et al. |
| 2017/0115713 | A1 | 4/2017 | Shin et al. |
| 2017/0133881 | A1 | 5/2017 | Cho et al. |
| 2017/0150443 | A1 | 5/2017 | Hijazi et al. |
| 2017/0177054 | A1 | 6/2017 | Vyas et al. |
| 2017/0179749 | A1 | 6/2017 | Mansour et al. |
| 2017/0307694 | A1 * | 10/2017 | Matsumura ............. G01S 19/42 |
| 2018/0091729 | A1 * | 3/2018 | Hanover ................ H04N 23/57 |
| 2018/0123379 | A1 | 5/2018 | Ha et al. |
| 2018/0145545 | A1 | 5/2018 | Azami et al. |
| 2018/0181185 | A1 | 6/2018 | Graham et al. |
| 2018/0217679 | A1 | 8/2018 | Kwon et al. |
| 2018/0351373 | A1 | 12/2018 | Behzadi et al. |
| 2019/0130087 | A1 | 5/2019 | Mori et al. |
| 2019/0305597 | A1 * | 10/2019 | Venkatraman .......... H02J 50/12 |
| 2020/0004310 | A1 | 1/2020 | Vyas et al. |
| 2020/0169107 | A1 * | 5/2020 | Joshi ..................... H01M 10/44 |
| 2020/0358302 | A1 * | 11/2020 | Kramar ................. H02J 7/0047 |
| 2020/0371577 | A1 | 11/2020 | Graham et al. |
| 2021/0141437 | A1 | 5/2021 | Graham et al. |
| 2021/0167621 | A1 | 6/2021 | Yazami et al. |
| 2021/0294470 | A1 | 9/2021 | Behzadi et al. |
| 2021/0377663 | A1 * | 12/2021 | Carrigan ................. H04L 65/75 |
| 2022/0147135 | A1 | 5/2022 | Graham et al. |
| 2023/0253809 | A1 | 8/2023 | Kramar et al. |
| 2024/0313554 | A1 | 9/2024 | Behzadi et al. |
| 2024/0313562 | A1 | 9/2024 | Kramar et al. |

FOREIGN PATENT DOCUMENTS

| | | | |
|---|---|---|---|
| CN | 1629776 | A | 6/2005 |
| CN | 101079506 | A | 11/2007 |
| CN | 101329595 | A | 12/2008 |
| CN | 101877745 | A | 11/2010 |
| CN | 101902062 | A | 12/2010 |
| CN | 101969511 | A | 2/2011 |
| CN | 102130367 | A | 7/2011 |
| CN | 102290837 | A | 12/2011 |
| CN | 103199311 | A | 7/2013 |
| CN | 103327159 | A | 9/2013 |
| CN | 103677520 | A | 3/2014 |
| CN | 103677559 | A | 3/2014 |
| CN | 103700900 | A | 4/2014 |
| CN | 203520050 | U | 4/2014 |
| CN | 103838992 | A | 6/2014 |
| CN | 103902010 | A | 7/2014 |
| CN | 103944230 | A | 7/2014 |

(56) References Cited

FOREIGN PATENT DOCUMENTS

| | | | |
|---|---|---|---|
| CN | 104113099 | A | 10/2014 |
| CN | 204105251 | U | 1/2015 |
| CN | 104377394 | A | 2/2015 |
| CN | 104428972 | A | 3/2015 |
| CN | 104902074 | A | 9/2015 |
| CN | 104967753 | A | 10/2015 |
| CN | 105071486 | A | 11/2015 |
| CN | 105610213 | A | 5/2016 |
| CN | 106617580 | A | 5/2017 |
| CN | 106786905 | A | 5/2017 |
| CN | 107360314 | A | 11/2017 |
| CN | 108205416 | A | 6/2018 |
| CN | 108336433 | A | 7/2018 |
| EP | 2051157 | A1 | 4/2009 |
| EP | 2610701 | A1 | 7/2013 |
| JP | 11-312029 | A | 11/1999 |
| JP | 2000-209660 | A | 7/2000 |
| JP | 2001-185236 | A | 7/2001 |
| JP | 2004-320909 | A | 11/2004 |
| JP | 2007-243726 | A | 9/2007 |
| JP | 2007-267221 | A | 10/2007 |
| JP | 2009-142149 | A | 6/2009 |
| JP | 2010-103956 | A | 5/2010 |
| JP | 2010-178498 | A | 8/2010 |
| JP | 2012-16170 | A | 1/2012 |
| JP | 2012-68494 | A | 4/2012 |
| JP | 2012-100491 | A | 5/2012 |
| JP | 2012-518981 | A | 8/2012 |
| JP | 2013-17282 | A | 1/2013 |
| JP | 2014-17989 | A | 1/2014 |
| JP | 2014-27544 | A | 2/2014 |
| JP | 2014-49061 | A | 3/2014 |
| JP | 2015-188275 | A | 10/2015 |
| JP | 2016-201354 | A | 12/2016 |
| JP | 2016-537910 | A | 12/2016 |
| KR | 10-2011-0121638 | A | 11/2011 |
| KR | 10-2011-0127243 | A | 11/2011 |
| KR | 10-2015-0065498 | A | 6/2015 |
| KR | 10-2015-0123437 | A | 11/2015 |
| KR | 10-2017-0054944 | A | 5/2017 |
| KR | 10-2018-0041718 | A | 4/2018 |
| TW | 200532429 | A | 10/2005 |
| TW | 201214268 | A | 4/2012 |
| WO | 2004/077291 | A1 | 9/2004 |
| WO | 2010/099242 | A2 | 9/2010 |
| WO | 2013/126078 | A1 | 8/2013 |
| WO | 2013/169849 | A2 | 11/2013 |
| WO | 2015/183336 | A1 | 12/2015 |
| WO | 2016/126733 | A1 | 8/2016 |
| WO | 2018/226259 | A1 | 12/2018 |
| WO | 2019/031811 | A1 | 2/2019 |

OTHER PUBLICATIONS

Office Action received for Japanese Patent Application No. 2024-201023, mailed on Jan. 27, 2025, 4 pages (2 pages of English Translation and 2 pages of Official Copy).

Notice of Allowance received for Taiwanese Patent Application No. 103135094, mailed on Oct. 28, 2016, 2 pages.

Xuguang, "Design and Development of the Electronic Circuit of Mechanical Current Meters", pp. 21-26. Cited by the Chinese Patent Office in an Office Action for related Patent Application No. 201880001496.0 on Feb. 18, 2023.

Corrected Notice of Allowance received for U.S. Appl. No. 17/197,987, mailed on Mar. 29, 2024, 2 pages.

Extended European Search Report received for European Patent Application No. 24156496.2, mailed on Jun. 12, 2024, 10 pages.

Intention to Grant received for European Patent Application No. 18702867.5, mailed on Dec. 18, 2023, 9 pages.

Notice of Acceptance received for Australian Patent Application No. 2023201077, mailed on Jul. 22, 2024, 3 pages.

Notice of Allowance received for Chinese Patent Application No. 202111429825.1, mailed on Feb. 9, 2024, 2 pages (1 page of English Translation and 1 page of Official Copy).

Notice of Allowance received for Chinese Patent Application No. 202111432087.6, mailed on Feb. 9, 2024, 2 pages (1 page of English Translation and 1 page of Official Copy).

Notice of Allowance received for Japanese Patent Application No. 2020-141884, mailed on Feb. 26, 2024, 26 pages (1 page of English Translation and 25 pages of Official Copy).

Notice of Allowance received for Japanese Patent Application No. 2023-075768, mailed on Oct. 25, 2024, 4 pages (1 page of English Translation and 3 pages of Official Copy).

Notice of Allowance received for U.S. Appl. No. 17/197,987, mailed on Jun. 14, 2024, 25 pages.

Notice of Allowance received for U.S. Appl. No. 17/197,987, mailed on Mar. 13, 2024, 19 pages.

Notice of Allowance received for U.S. Appl. No. 18/135,045, mailed on Feb. 16, 2024, 10 pages.

Office Action received for Australian Patent Application No. 2023201077, mailed on Feb. 16. 2024, 4 pages.

Office Action received for Australian Patent Application No. 2023201077, mailed on Jun. 4, 2024, 3 pages,.

Office Action received for Chinese Patent Application No. 202080034129.8, mailed on Jul. 2, 2024, 23 pages (13 pages of English Translation and 10 pages of Official Copy).

Office Action received for Chinese Patent Application No. 202111429825.1, mailed on Oct. 19, 2023, 11 pages (5 pages of English Translation and 6 pages of Official Copy).

Office Action received for Chinese Patent Application No. 202111430197.9, mailed on Mar. 6, 2024, 13 pages (3 pages of English Translation and 10 pages of Official Copy).

Office Action received for Chinese Patent Application No. 202111430197.9, mailed on Oct. 13, 2023, 20 pages (7 pages of English Translation and 13 pages of Official Copy).

Office Action received for Chinese Patent Application No. 202111432087.6, mailed on Oct. 12, 2023, 10 pages (4 pages of English Translation and 6 pages of Official Copy).

Office Action received for European Patent Application No. 18702867. 5. mailed on Feb. 20, 2024, 4 pages.

Office Action received for European Patent Application No. 20719061. 2, mailed on Jul. 3, 2024, 3 pages.

Office Action received for Japanese Patent Application No. 2023-075768, mailed on Jun. 3, 2024, 8 pages (4 pages of English Translation and 4 pages of Official Copy).

Supplemental Notice of Allowance received for U.S. Appl. No. 17/197,987, mailed on Jul. 29, 2024, 2 pages.

Supplemental Notice of Allowance received for U.S. Appl. No. 18/135,045, mailed on May 22, 2024, 6 pages.

Non-Final Office Action received for U.S. Appl. No. 18/671,786, mailed on Nov. 29, 2024, 14 pages.

Advisory Action received for U.S. Appl. No. 15/831,173, mailed on Jan. 9, 2020, 4 pages.

Advisory Action received for U.S. Appl. No. 16/688,529, mailed on Nov. 9, 2022, 5 pages.

Advisory Action received for U.S. Appl. No. 17/197,987, mailed on Jul. 6, 2023, 4 pages.

Applicant Initiated Interview Summary received for U.S. Appl. No. 15/831,173, mailed on Dec. 30, 2019, 4 pages.

Applicant Initiated Interview Summary received for U.S. Appl. No. 15/902,401, mailed on Oct. 28, 2019, 4 pages.

Applicant Initiated Interview Summary received for U.S. Appl. No. 17/157,391, mailed on Nov. 23, 2021, 2 pages.

Applicant-Initiated Interview Summary received for U.S. Appl. No. 15/831,173, mailed on Jul. 10, 2020, 4 pages.

Applicant-Initiated Interview Summary received for U.S. Appl. No. 16/570,113, mailed on Oct. 14, 2021, 2 pages.

Applicant-Initiated Interview Summary received for U.S. Appl. No. 16/688,529, mailed on May 16, 2022, 2 pages.

Applicant-Initiated Interview Summary received for U.S. Appl. No. 16/688,529, mailed on Nov. 1, 2022, 2 pages.

Applicant-Initiated Interview Summary received for U.S. Appl. No. 17/197,987, mailed on Dec. 20, 2022, 4 pages.

Applicant-Initiated Interview Summary received for U.S. Appl. No. 17/197,987, mailed on Jun. 2, 2023, 5 pages.

(56) References Cited

OTHER PUBLICATIONS

Board Decision received for Chinese Patent Application No. 201580047640.0, mailed on Jun. 29, 2021, 2 pages (1 page of English Translation and 1 page of Official Copy).
Certificate of Examination received for Australian Patent Application No. 2017100760 mailed on Feb. 9, 2018., 2 pages.
Corrected Notice of Allowance received for U.S. Appl. No. 16/841,352, mailed on Dec. 2, 2020, 2 pages.
Corrected Notice of Allowance received for U.S. Appl. No. 17/157,391, mailed on Dec. 30, 2021, 2 pages.
Decision to Grant received for European Patent Application No. 14790403.1, mailed on Oct. 18, 2018, 2 pages.
Decision to Grant received for European Patent Application No. 18197727.3, mailed on Mar. 12, 2020, 2 pages.
Decision to Grant received for European Patent Application No. 20162687.6, mailed on Sep. 23, 2021, 2 pages.
Examiner's Pre-Review Report received for Japanese Patent Application No. 2020-141884, mailed on Jul. 31, 2023, 6 pages (3 pages of English Translation and 3 pages of Official Copy).
Extended European Search Report received for European Patent Application No. 18197727.3, mailed on Dec. 4, 2018, 9 pages.
Extended European Search Report received for European Patent Application No. 20162687.6, mailed on Jun. 17, 2020, 7 pages.
Final Office Action received for U.S. Appl. No. 14/503,078, mailed on Nov. 15, 2016, 12 pages.
Final Office Action received for U.S. Appl. No. 14/817,572, mailed on Mar. 23, 2017, 14 pages.
Final Office Action received for U.S. Appl. No. 15/831,173, mailed on Oct. 4, 2019, 90 pages.
Final Office Action received for U.S. Appl. No. 16/570,113, mailed on Oct. 5, 2021, 18 pages.
Final Office Action received for U.S. Appl. No. 16/688,529, mailed on Sep. 7, 2022, 11 pages.
Final Office Action received for U.S. Appl. No. 17/197,987, mailed on May 12, 2023, 33 pages.
Intention to Grant received for European Patent Application No. 14790403.1, mailed on Jun. 1, 2018, 5 pages.
Intention to Grant received for European Patent Application No. 18197727.3, mailed on Nov. 7, 2019, 7 pages.
Intention to Grant received for European Patent Application No. 18702867.5, mailed on Jun. 21, 2023, 9 pages.
Intention to Grant received for European Patent Application No. 20162687.6, mailed on May 6, 2021, 8 pages.
International Preliminary Report on Patentability received for PCT Patent Application No. PCT/US2014/058466, mailed on Dec. 15, 2016, 11 pages.
International Preliminary Report on Patentability received for PCT Patent Application No. PCT/US2015/043487, mailed on Feb. 16, 2017., 13 Pages.
International Preliminary Report on Patentability received for PCT Patent Application No. PCT/US2018/013730, mailed on Oct. 1, 2019, 14 pages.
International Preliminary Report on Patentability received for PCT Patent Application No. PCT/US2020/024292, mailed on Nov. 18, 2021, 8 pages.
International Search Report and Written Opinion received for PCT Patent Application No. PCT/US2018/013730, mailed on Jul. 9, 2018, 20 pages.
International Search Report and Written Opinion received for PCT Patent Application No. PCT/US2020/024292, mailed on Jun. 12, 2020, 11 pages.
Invitation to Pay Addition Fees and Partial International Search Report received for PCT Patent Application No. PCT/US2018/013730, mailed on May 15, 2018, 14 pages.
Non-Final Office Action received for U.S. Appl. No. 14/817,572, mailed on Sep. 12, 2016, 9 pages.
Non-Final Office Action received for U.S. Appl. No. 15/452,536, mailed on Dec. 20, 2018, 10 pages.
Non-Final Office Action received for U.S. Appl. No. 15/831,173, mailed on Jan. 28, 2019, 44 pages.
Non-Final Office Action received for U.S. Appl. No. 15/831,173, mailed on Mar. 23, 2020, 93 pages.
Non-Final Office Action received for U.S. Appl. No. 15/902,401, mailed on Jul. 19, 2019, 11 pages.
Non-Final Office Action received for U.S. Appl. No. 16/570,113, mailed on Apr. 20, 2021, 28 pages.
Non-Final Office Action received for U.S. Appl. No. 16/688,529, mailed on Feb. 28, 2022, 11 pages.
Non-Final Office Action received for U.S. Appl. No. 17/157,391, mailed on Aug. 23, 2021, 12 pages.
Non-Final Office Action received for U.S. Appl. No. 17/197,987, mailed on Oct. 5, 2022, 24 pages.
Non-Final Office Action received for U.S. Appl. No. 17/583,657, mailed on Sep. 13, 2022, 13 pages.
Notice of Acceptance received for Australian Patent Application No. 2018279782, mailed on Oct. 31, 2020, 3 pages.
Notice of Acceptance for Australian Patent Application No. 2021200894, mailed on Nov. 14, 2022, 3 pages.
Notice of Allowance received for Chinese Patent Application No. 201580047640.0, mailed on Sep. 18, 2021, 2 pages (1 page of English Translation and 1 page of Official Copy).
Notice of Allowance received for Chinese Patent Application No. 201880001496.0, mailed on Apr. 25, 2023, 5 pages (1 page of English Translation and 4 pages of Official Copy).
Notice of Allowance received for Japanese Patent Application No. 2018-551208, mailed on Jul. 31, 2020, 4 pages (1 page of English Translation and 3 pages of Official Copy).
Notice of Allowance received for Korean Patent Application No. 10-2019-7035420, mailed on Jan. 22, 2021, 4 pages (1 page of English Translation and 3 pages of Official Copy).
Notice of Allowance received for Korean Patent Application No. 10-2021-7012459, mailed on Jan. 17, 2022, 5 pages (1 page of English Translation and 4 pages of Official Copy).
Notice of Allowance received for Taiwanese Patent Application No. 103135094, mailed on Oct. 28, 2016, 2 pages (Official Copy only) (See Communication Under Rule 37 CFR § 1.98(a) (3)).
Notice of Allowance received for Taiwanese Patent Application No. 104107332, mailed on Jun. 21, 2019, 5 pages (2 pages of English Translation and 3 pages of Official Copy).
Notice of Allowance received for U.S. Appl. No. 14/503,078, mailed on Feb. 1, 2017, 8 pages.
Notice of Allowance received for U.S. Appl. No. 14/817,572, mailed on Nov. 30, 2017, 26 pages.
Notice of Allowance received for U.S. Appl. No. 15/452,536, mailed on May 7, 2019, 8 pages.
Notice of Allowance received for U.S. Appl. No. 15/831,173, mailed on Dec. 23, 2020, 6 pages.
Notice of Allowance received for U.S. Appl. No. 15/831,173, mailed on Nov. 4, 2020, 10 pages.
Notice of Allowance received for U.S. Appl. No. 15/902,401, mailed on Dec. 4, 2019, 8 pages.
Notice of Allowance received for U.S. Appl. No. 16/570,113, mailed on Dec. 14, 2021, 7 pages.
Notice of Allowance received for U.S. Appl. No. 16/688,529, mailed on Jan. 6, 2023, 9 pages.
Notice of Allowance received for U.S. Appl. No. 16/841,352, mailed on Oct. 27, 2020, 13 pages.
Notice of Allowance received for U.S. Appl. No. 17/157,391, mailed on Dec. 17, 2021, 8 pages.
Notice of Allowance received for U.S. Appl. No. 17/583,657, mailed on Nov. 16, 2022, 8 pages.
Office Action received for Australian Patent Application No. 2017100760, mailed on Aug. 10, 2017, 4 pages.
Office Action received for Australian Patent Application No. 2017100760, mailed on Jan. 30, 2018, 3 Pages.
Office Action received for Australian Patent Application No. 2018279782, mailed on Jun. 24, 2020, 5 pages.
Office Action received for Australian Patent Application No. 2021200894, mailed on Apr. 26, 2022, 3 pages.
Office Action received for Australian Patent Application No. 2021200894, mailed on Dec. 20, 2021, 6 pages.
Office Action received for Australian Patent Application No. 2021200894, mailed on Jul. 13, 2022, 4 pages.

(56) References Cited

OTHER PUBLICATIONS

Office Action received for Chinese Patent Application No. 201580047640.0, mailed on Aug. 5, 2019, 18 pages (7 pages of English Translation and 11 pages of Official Copy).
Office Action received for Chinese Patent Application No. 201580047640.0, mailed on Jul. 6, 2021, 10 pages (5 pages of English Translation and 5 pages of Official Copy).
Office Action received for Chinese Patent Application No. 201580047640.0, mailed on Mar. 3, 2021, 11 pages (3 pages of English Translation and 8 pages of Official copy).
Office Action received for Chinese Patent Application No. 201580047640.0, mailed on Oct. 16, 2020, 20 pages (6 pages of English Translation and 14 pages of Official Copy).
Office Action received for Chinese Patent Application No. 201880001496.0, mailed on Feb. 18, 2023, 13 pages (5 pages of English Translation and 8 pages of Official Copy).
Office Action received for Danish Patent Application No. PA201770089, mailed on Apr. 25, 2017, 10 pages.
Office Action received for Danish Patent Application No. PA201870024, mailed on Dec. 21, 2018, 5 Pages.
Office Action received for Danish Patent Application No. PA201870024, mailed on Oct. 2, 2019, 2 pages.
Office Action received for European Patent Application No. 18702867.5, mailed on Sep. 13, 2021, 4 pages.
Office Action received for European Patent Application No. 20719061.2, mailed on Oct. 19, 2022, 4 pages.
Office Action received for German Patent Application No. 212015000194.6, mailed on Mar. 16, 2017, 2 pages (1 page of English Translation and 1 page of Official Copy).
Office Action received for Japanese Patent Application No. 2020-141884, mailed on Jan. 5, 2023,, 8 pages (4 pages of English Translation & 4 pages of Official Copy).
Office Action received for Japanese Patent Application No. 2020-141884, mailed on May 20, 2022, 10 pages (5 pages of English Translation and 5 pages of Official Copy).
Office Action received for Japanese Patent Application No. 2020-141884, mailed on Sep. 27, 2021, 10 pages (5 pages of English Translation and 5 pages of Official Copy).
Office Action received for Korean Patent Application No. 10-2021-7012459, mailed on Aug. 18, 2021, 5 pages (2 pages of English Translation and 3 pages of Official Copy).
Office Action received for Taiwanese Patent Application No. 104107332, mailed on Oct. 29, 2018, 12 pages (5 pages of English Translation and 7 pages of Official Copy).
Search Report received for Danish Patent Application No. PA201870024, mailed on Apr. 11, 2018, 10 pages.
Supplemental Notice of Allowance received for U.S. Appl. No. 15/902,401, mailed on Feb. 3, 2020, 2 pages.
Supplemental Notice of Allowance received for U.S. Appl. No. 15/902,401, mailed on Feb. 13, 2020, 2 pages.
Supplemental Notice of Allowance received for U.S. Appl. No. 16/688,529, mailed on Jan. 17, 2023, 2 pages.
Written Opinion received for PCT Patent Application No. PCT/US2018/013730, mailed on May 9, 2019, 13 pages.
Office Action received for Taiwanese Patent Application No. 103135094, mailed on Feb. 25, 2016, 20 pages (8 pages of English Translation and 12 pages of Official Copy).
Non-Final Office Action received for U.S. Appl. No. 14/503,078, mailed on Mar. 29, 2016, 11 pages.
Athukorala et al., "How Carat Affects User Behavior: Implications for Mobile Battery Awareness Applications", Proceedings of the SIGCHI Conference on Human Factors in Computing Systems, CHI 2014, Apr. 26-May 1, 2014, pp. 1029-1038.
Howcast, "How to Eject an iPod from a computer", Online available at: https://www.youtube.com/watch?v=DUmBOycraQk, Feb. 9, 2010, 1 page.
Oliner et al., "Carat: Collaborative Energy Diagnosis for Mobile Devices", SENSYS' 13, Available at <https://amplab.cs.berkeley.edu/wp-content/uploads/2013/10/oliner-Carat-SenSys13.pdf>, Nov. 11, 2013, 16 pages.
International Search Report and Written Opinion received for PCT Patent Application No. PCT/US2014/058466, mailed on Jun. 24, 2015, 16 pages.
Invitation to Pay Additional Fees and Partial Search Report received for PCT Patent Application No. PCT/US2014/058466, mailed on Mar. 3, 2015, 6 pages.
International Search Report and Written Opinion received for PCT Patent Application No. PCT/US2015/043487, mailed on Jan. 29, 2016, 19 pages.
Invitation to Pay Additional Fees and Partial Search Report received for PCT Patent Application No. PCT/US2015/043487, mailed on Nov. 9, 2015, 4 pages.
Xuguang,"Design and Development of the Electronic Circuit of Mechanical Current Meters", Journal of Ocean Technology, vol. 34, No. 1, Feb. 2015, pp. 21-26 (Official Copy Only) (See Communication Under Rule 37 CFR § 1.98(a) (3)).
Corrected Notice of Allowance received for U.S. Appl. No. 18/671,786, mailed on Mar. 19, 2025, 2 pages.
Notice of Allowance received for U.S. Appl. No. 18/671,786, mailed on Mar. 10, 2025, 8 pages.
Notice of Allowance received for Japanese Patent Application No. 2024-201023, mailed on May 30, 2025, 4 pages (1 page of English Translation and 3 pages of Official Copy).
Office Action received for Chinese Patent Application No. 202080034129.8, mailed on Apr. 29, 2025, 18 pages (12 pages of English Translation and 6 pages of Official Copy).
Office Action received for Australian Patent Application No. 2024227065, mailed on Nov. 21, 2025, 5 pages.
Office Action received for European Patent Application No. 24156496.2, mailed on Nov. 18, 2025, 8 pages.
Intention to Grant received for European Patent Application No. 18702867.5, mailed on Feb. 18, 2026, 9 pages.
Notice of Acceptance received for Australian Patent Application No. 2024227065, mailed on Feb. 11, 2026, 3 pages.
Notice of Acceptance received for Australian Patent Application No. 2024227065, mailed on Feb. 19, 2026, 3 pages.
Office Action received for Chinese Patent Application No. 202080034129.8, mailed on Oct. 11, 2025, 14 pages (6 pages of English Translation and 8 pages of Official Copy).

* cited by examiner

USER INTERFACES FOR DEVICE CHARGING

CROSS-REFERENCE TO RELATED APPLICATIONS

This application claims priority to U.S. Provisional Patent Application No. 63/403,244, entitled "USER INTERFACES FOR DEVICE CHARGING," filed Sep. 1, 2022, the content of which is hereby incorporated by reference in its entirety.

FIELD

The present disclosure relates generally to computer user interfaces, and more specifically to techniques for managing charging of a device.

BACKGROUND

Electronic devices continue to become more prevalent in day-to-day activities. For example, smart phones and tablet computers continue to grow in popularity, and provide everyday personal and business functions to users. These electronic devices are usually operational for the majority of a typical day, where a user my utilize the electronic device to send messages (text, e-mail, etc.), work on documents, play games, conduct phone calls, and perform other personal and/or business specific tasks.

With extensive daily use, the desire to have a long battery life is one of the most important operational characteristics of the electronic device. However, as the overall size of the electronic device continues to get smaller, the internal space of the electronic device also gets smaller. This reduced internal space may result in a smaller battery as well. With a smaller battery utilized in electronic device, the battery may need to be charged daily, or even several times a day. In many cases, the overall life and/or capacity of a battery, over time, is dependent on charging characteristics.

BRIEF SUMMARY

Some techniques for managing charging of a device, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices. Existing techniques can also fail to mitigate loss of battery life (e.g., a loss of maximum battery capacity) that can result from a battery being overcharged and/or maintained at a high level of charge for an extended amount of time.

Accordingly, the present technique provides electronic devices with faster, more efficient methods and interfaces for managing charging of a device. Such methods and interfaces optionally complement or replace other methods for managing charging of a device. Such methods and interfaces reduce the cognitive burden on a user and produce a more efficient human-machine interface. For battery-operated computing devices, such methods and interfaces conserve power, improve battery life, and increase the time between battery charges. Moreover, such methods and interface can mitigate loss of battery life by limiting the battery being overcharged and/or maintained at a high level of charge for an extended amount of time.

In accordance with some embodiments, a method, performed at a computer system with an energy storage component and that is in communication with a display generation component, is described. The method includes: displaying a user interface that includes a charge status indicator, wherein: in accordance with a determination that a first set of one or more charging criteria are met: the computer system is configured to charge the energy storage component to a first charging level; and the charge status indicator is displayed with a first end charge indication that indicates that charging of the energy storage component will end before the energy storage component is charged above the first charging level; and in accordance with the determination that a second set of one or more charging criteria are met: the computer system is configured to charge the energy storage component to a second charging level that is higher than the first charging level; and the charge status indicator is displayed without the first end charge indication.

In accordance with some embodiments, a non-transitory computer-readable storage medium storing one or more programs configured to be executed by one or more processors of a computer system with an energy storage component and that is in communication with a display generation component, is described. The one or more programs including instructions for: displaying a user interface that includes a charge status indicator, wherein: in accordance with a determination that a first set of one or more charging criteria are met: the computer system is configured to charge the energy storage component to a first charging level; and the charge status indicator is displayed with a first end charge indication that indicates that charging of the energy storage component will end before the energy storage component is charged above the first charging level; and in accordance with the determination that a second set of one or more charging criteria are met: the computer system is configured to charge the energy storage component to a second charging level that is higher than the first charging level; and the charge status indicator is displayed without the first end charge indication.

In accordance with some embodiments, a transitory computer-readable storage medium storing one or more programs configured to be executed by one or more processors of a computer system with an energy storage component and that is in communication with a display generation component, is described. The one or more programs including instructions for: displaying a user interface that includes a charge status indicator, wherein: in accordance with a determination that a first set of one or more charging criteria are met: the computer system is configured to charge the energy storage component to a first charging level; and the charge status indicator is displayed with a first end charge indication that indicates that charging of the energy storage component will end before the energy storage component is charged above the first charging level; and in accordance with the determination that a second set of one or more charging criteria are met: the computer system is configured to charge the energy storage component to a second charging level that is higher than the first charging level; and the charge status indicator is displayed without the first end charge indication.

In accordance with some embodiments, a computer system with an energy storage component and that is configured to communicate with a display generation component is described. The computer system comprising: one or more processors; and memory storing one or more programs configured to be executed by the one or more processors, the one or more programs including instructions for: displaying a user interface that includes a charge status indicator, wherein: in accordance with a determination that a first set of one or more charging criteria are met: the computer system is configured to charge the energy storage component to a first charging level; and the charge status indicator is displayed with a first end charge indication that indicates that charging of the energy storage component will end before the energy storage component is charged above the first charging level; and in accordance with the determination that a second set of one or more charging criteria are met: the computer system is configured to charge the energy storage component to a second charging level that is higher than the first charging level; and the charge status indicator is displayed without the first end charge indication.

In accordance with some embodiments, a computer system with an energy storage component and that is configured to communicate with a display generation component is described. The computer system includes: means for displaying a user interface that includes a charge status indicator, wherein: in accordance with a determination that a first set of one or more charging criteria are met: the computer system is configured to charge the energy storage component to a first charging level; and the charge status indicator is displayed with a first end charge indication that indicates that charging of the energy storage component will end before the energy storage component is charged above the first charging level; and in accordance with the determination that a second set of one or more charging criteria are met: the computer system is configured to charge the energy storage component to a second charging level that is higher than the first charging level; and the charge status indicator is displayed without the first end charge indication.

In accordance with some embodiments, a computer program product, comprising one or more programs configured to be executed by one or more processors of a computer system with an energy storage component and that is in communication with a display generation component, is described. The one or more programs including instructions for: displaying a user interface that includes a charge status indicator, wherein: in accordance with a determination that a first set of one or more charging criteria are met: the computer system is configured to charge the energy storage component to a first charging level; and the charge status indicator is displayed with a first end charge indication that indicates that charging of the energy storage component will end before the energy storage component is charged above the first charging level; and in accordance with the determination that a second set of one or more charging criteria are met: the computer system is configured to charge the energy storage component to a second charging level that is higher than the first charging level; and the charge status indicator is displayed without the first end charge indication.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing charging of a device, thereby increasing the effectiveness, efficiency, and user satisfaction with such devices. Such methods and interfaces may complement or replace other methods for managing charging of a device.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing charging of a device. Such techniques can reduce the cognitive burden on a user who charges devices, thereby enhancing productivity. Further, such techniques can reduce processor and battery power otherwise wasted on redundant user inputs.

Figure 6:
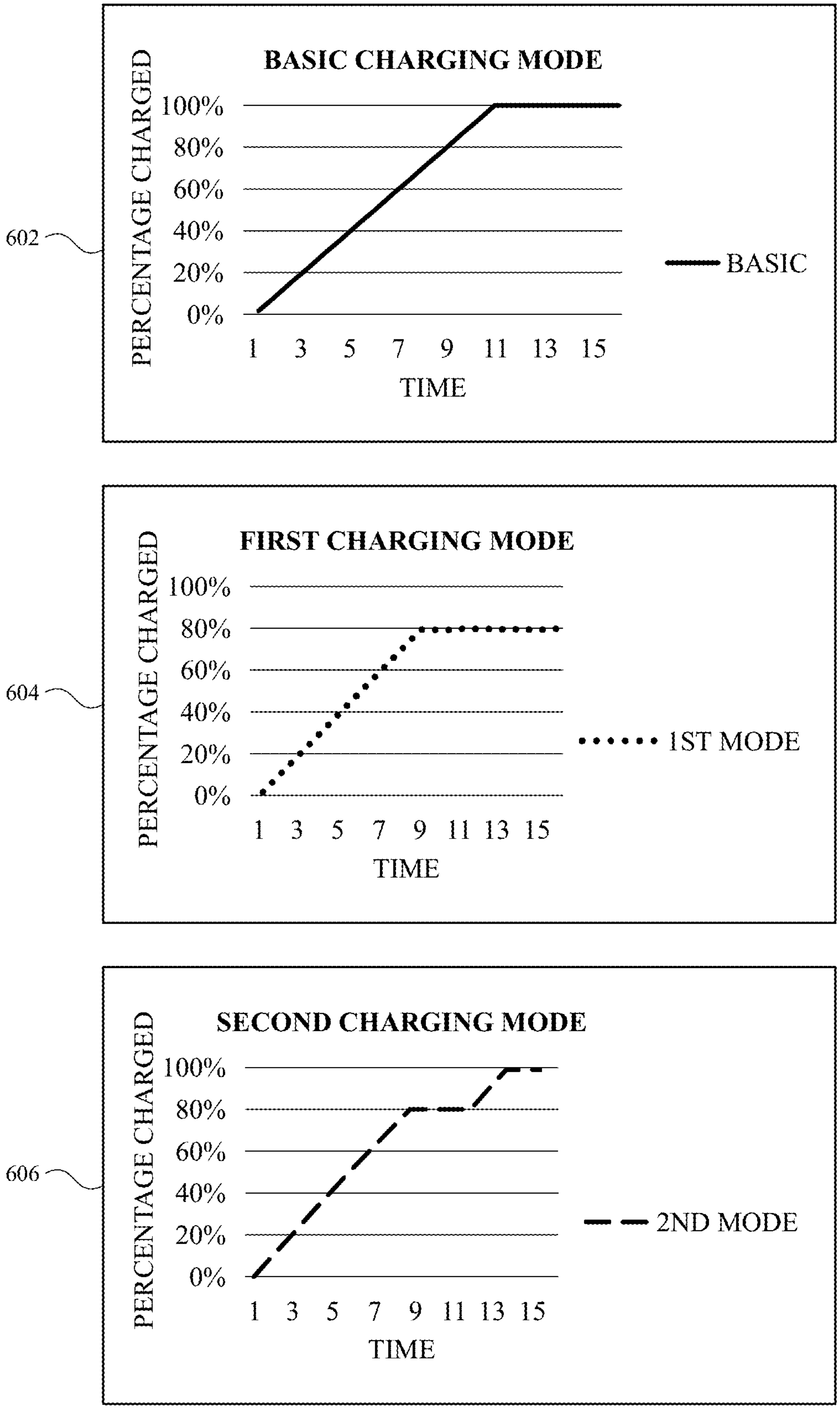
FIG. 6 illustrates charging modes for an electronic device.
Figure 7A:
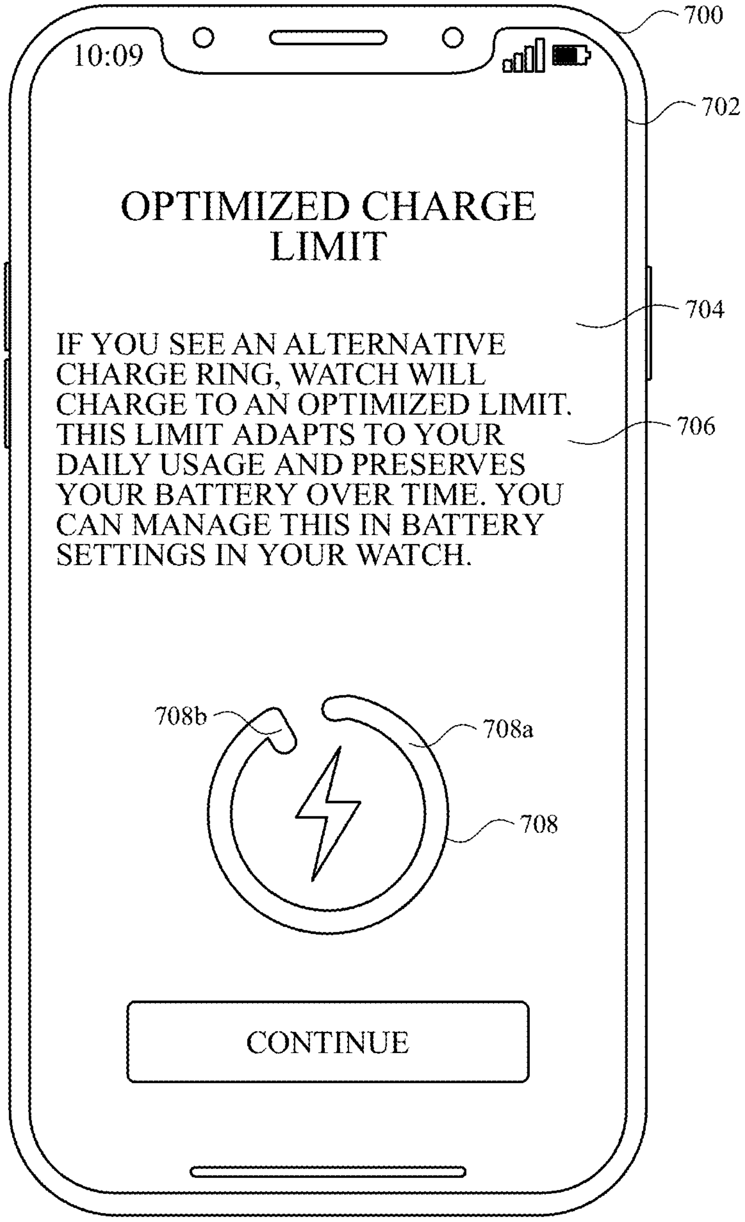
FIG. 7A-7R illustrate exemplary user interfaces for managing charging of an electronic device in accordance with some embodiments.
Figure 7R:
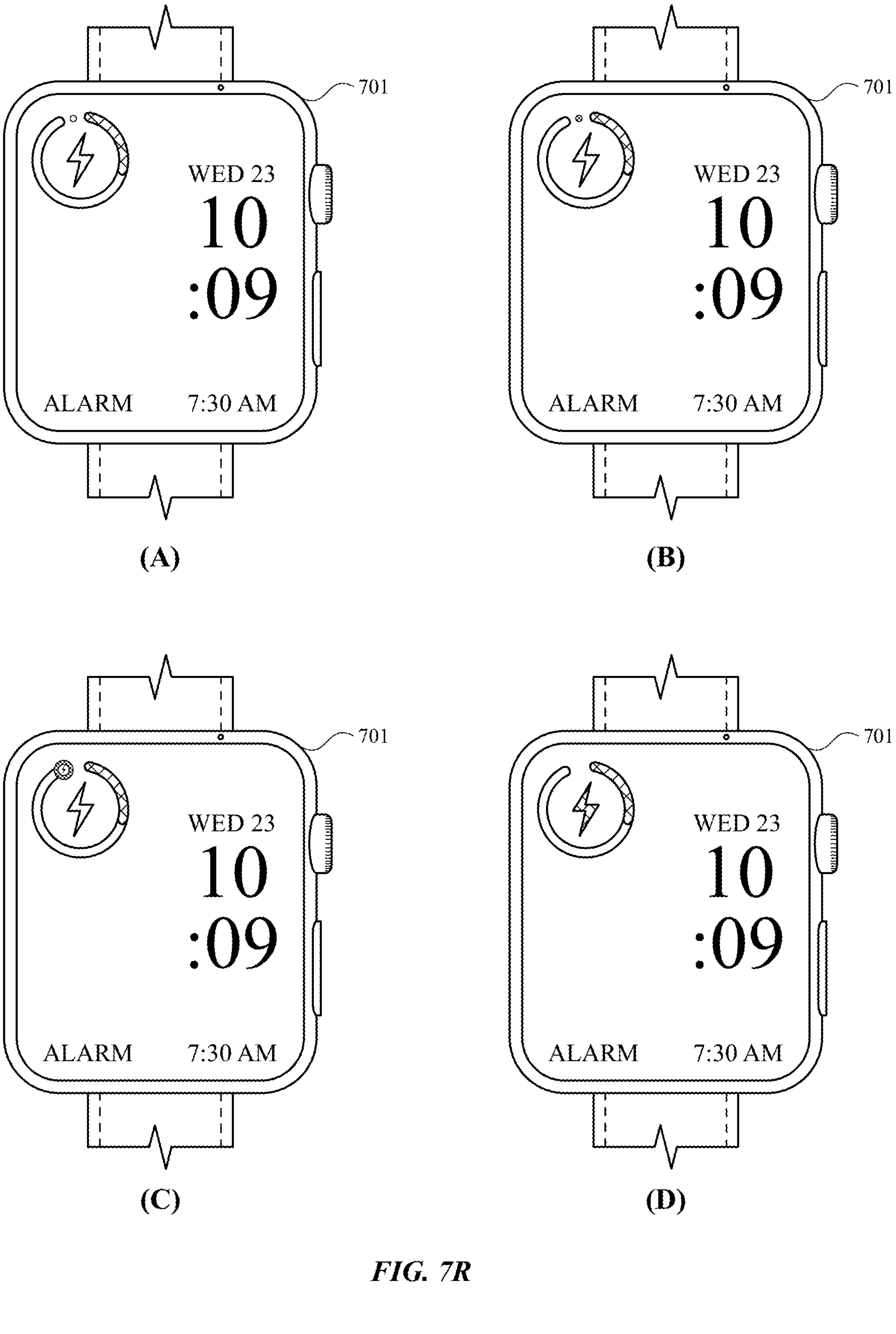
Figure 8:
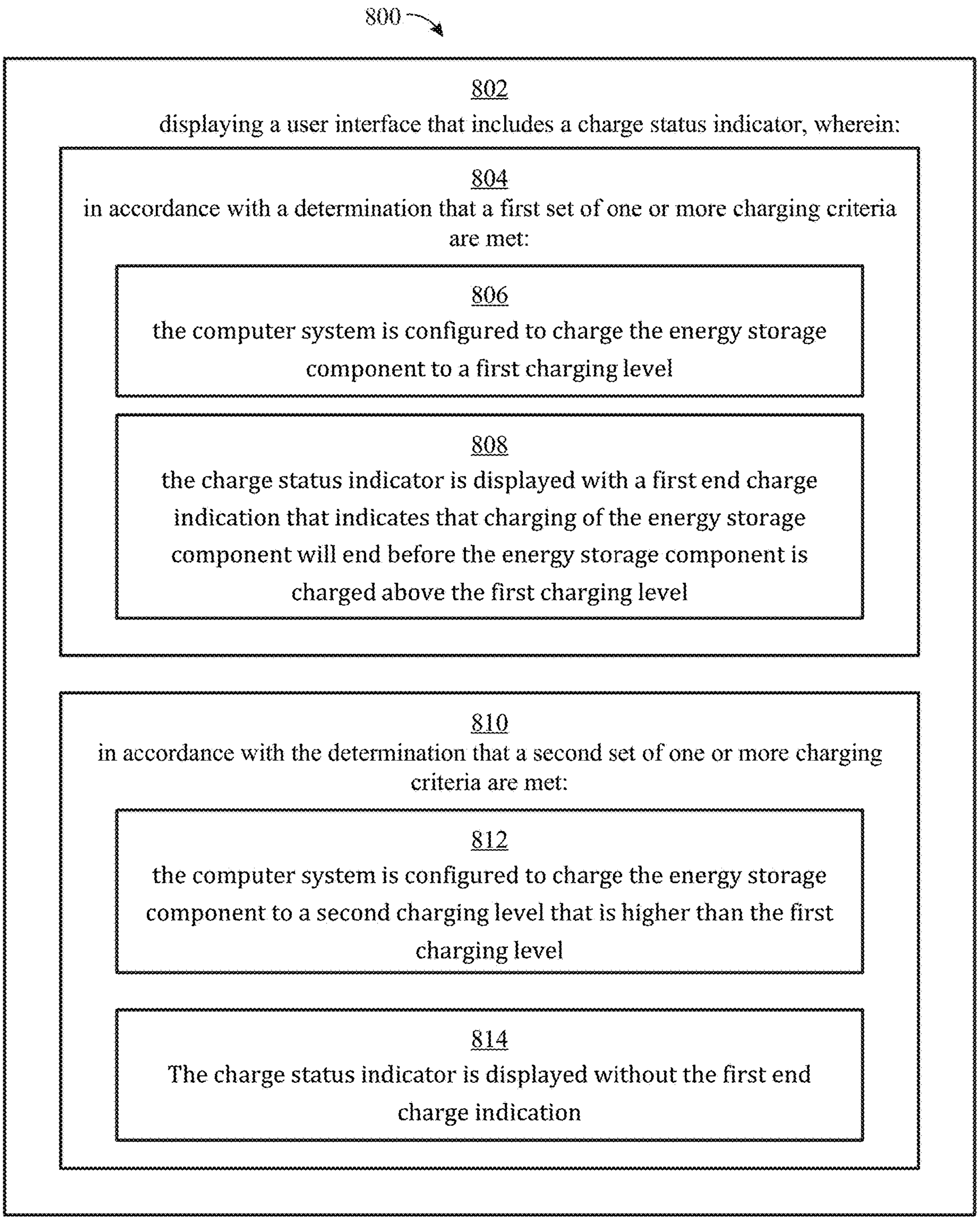
FIG. 8 is a flow diagram illustrating a method for managing charging of an electronic device in accordance with some embodiments.

Below, FIGS. 1A-1B, 2, 3, 4A-4B, and 5A-5B provide a description of exemplary devices for performing the techniques for managing event notifications. FIG. 6 illustrates charging modes for an electronic device. FIGS. 7A-7R user interfaces for managing charging of an electronic device. FIG. 8 is a flow diagram illustrating methods for managing charging of an electronic device in accordance with some embodiments. The user interfaces in FIGS. 7A-7R are used to illustrate the processes described below, including the processes in FIG. 8.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms “first,” “second,” etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

The term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, “displaying” content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
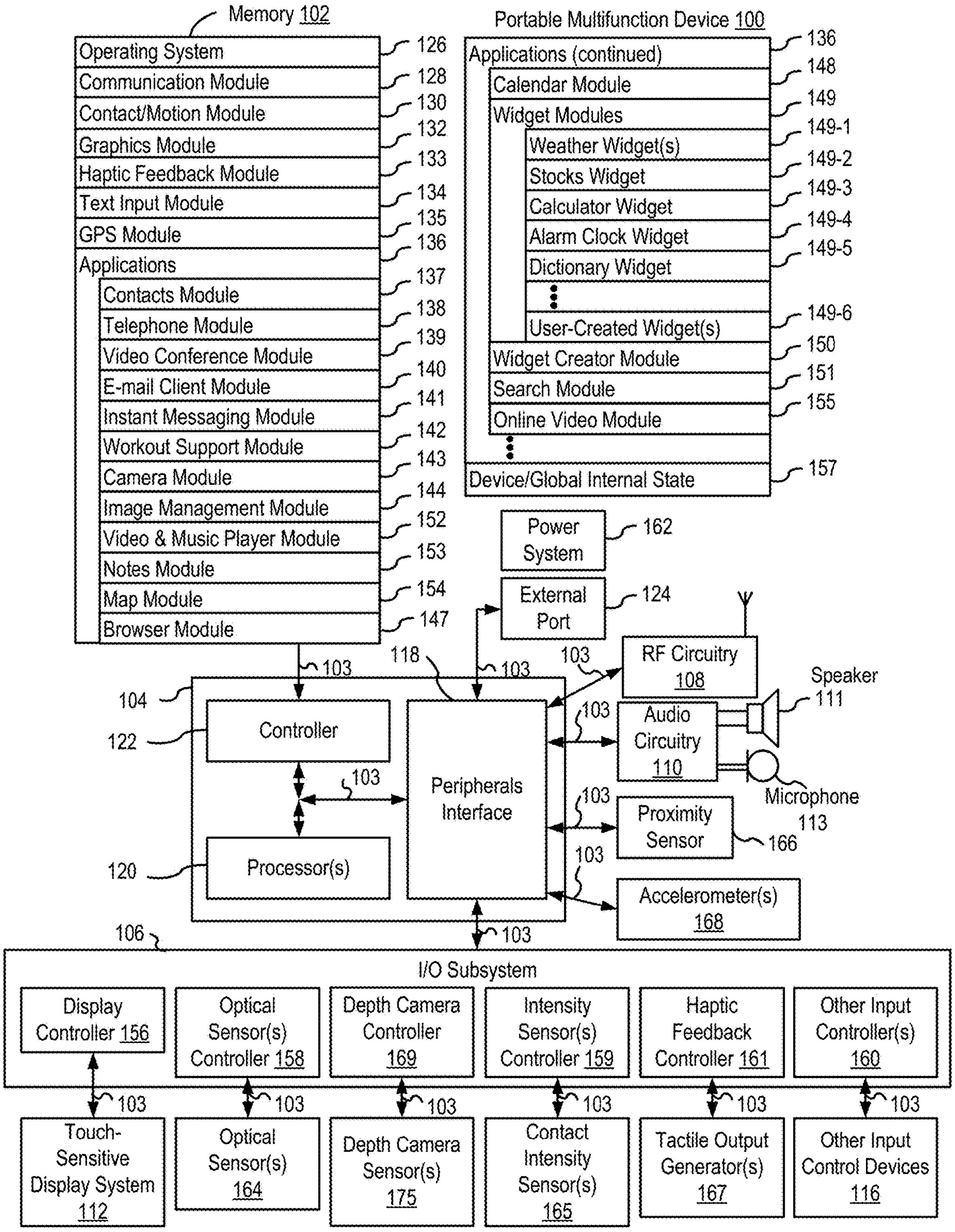
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a “touch screen” for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
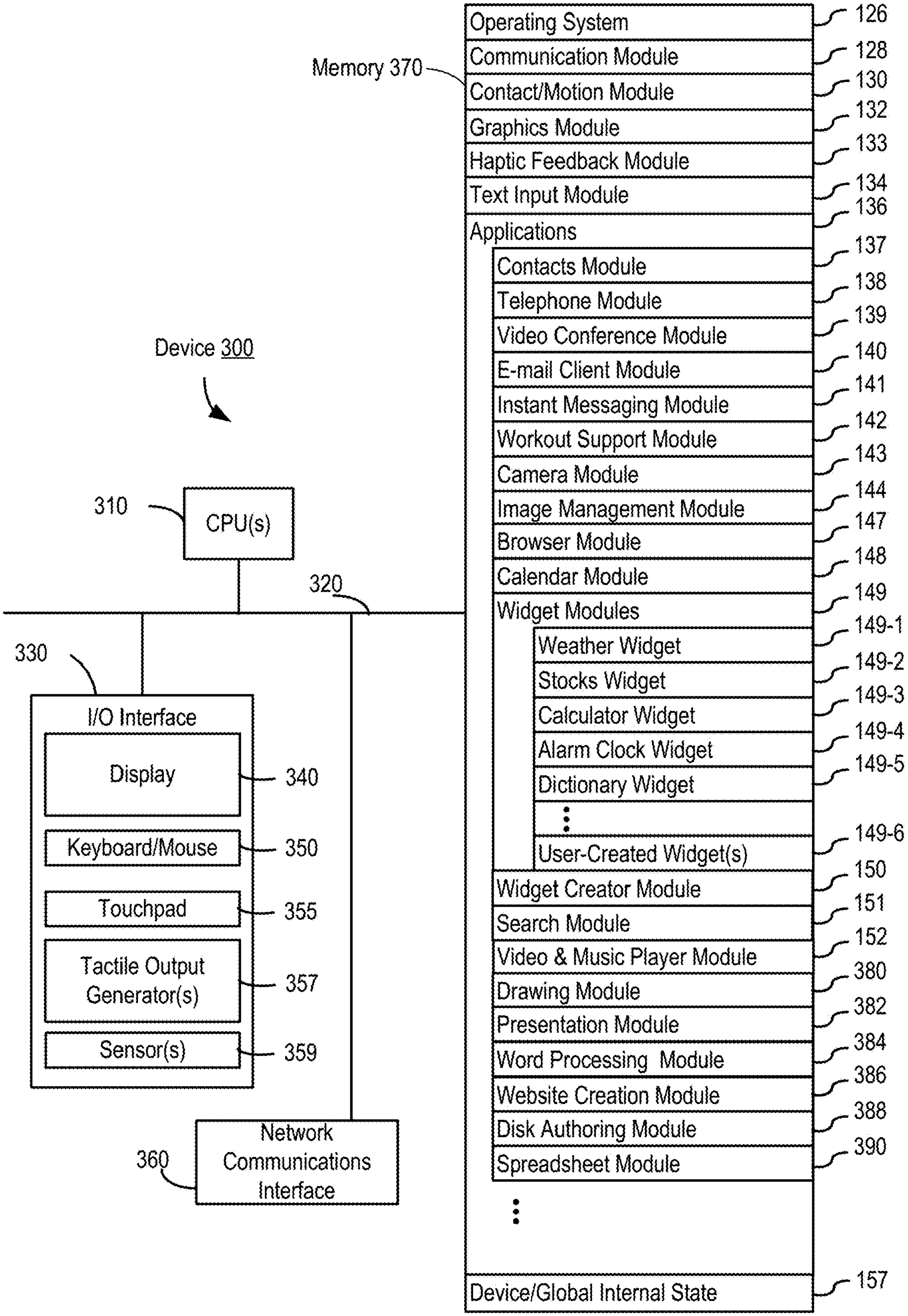
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
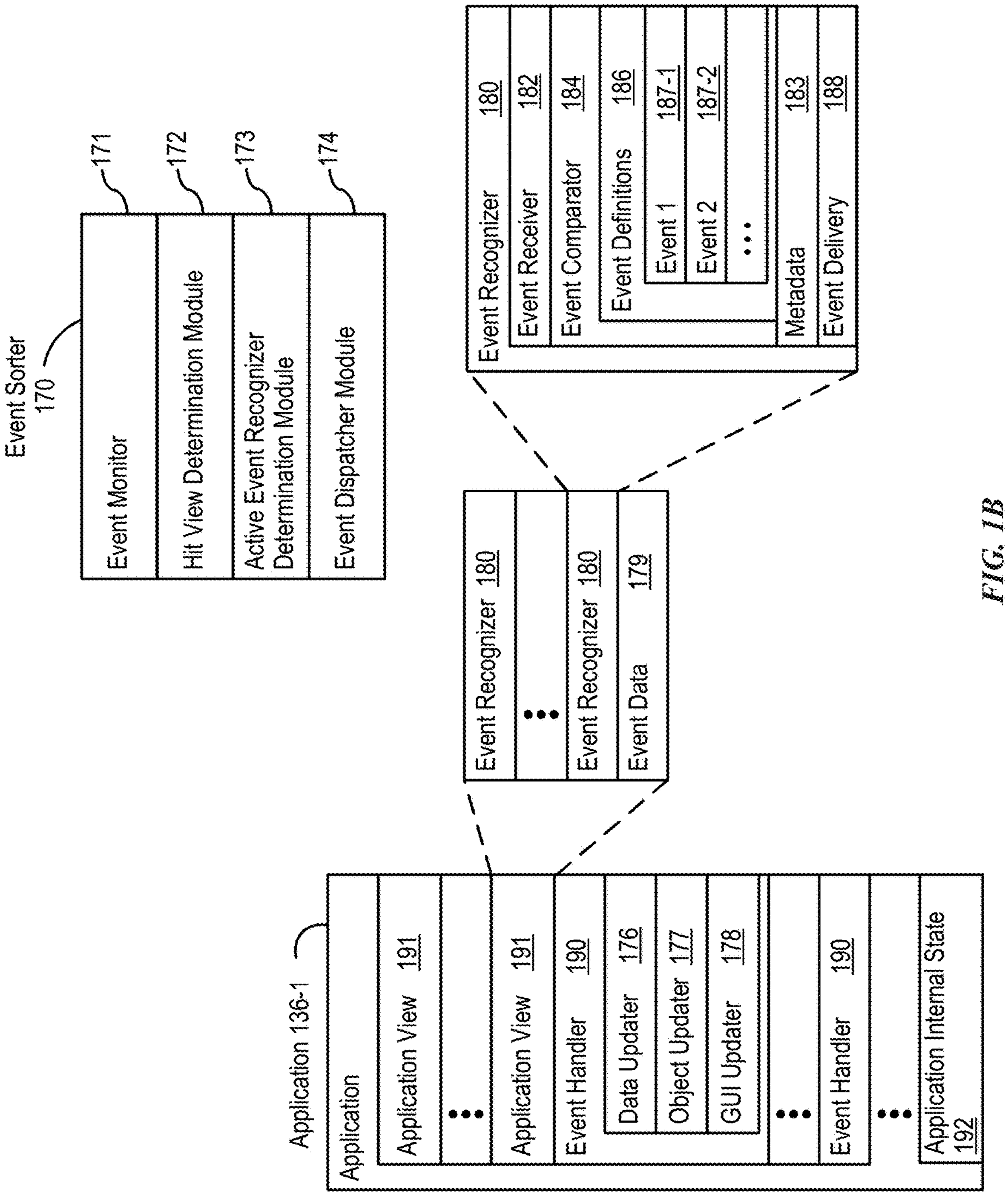
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
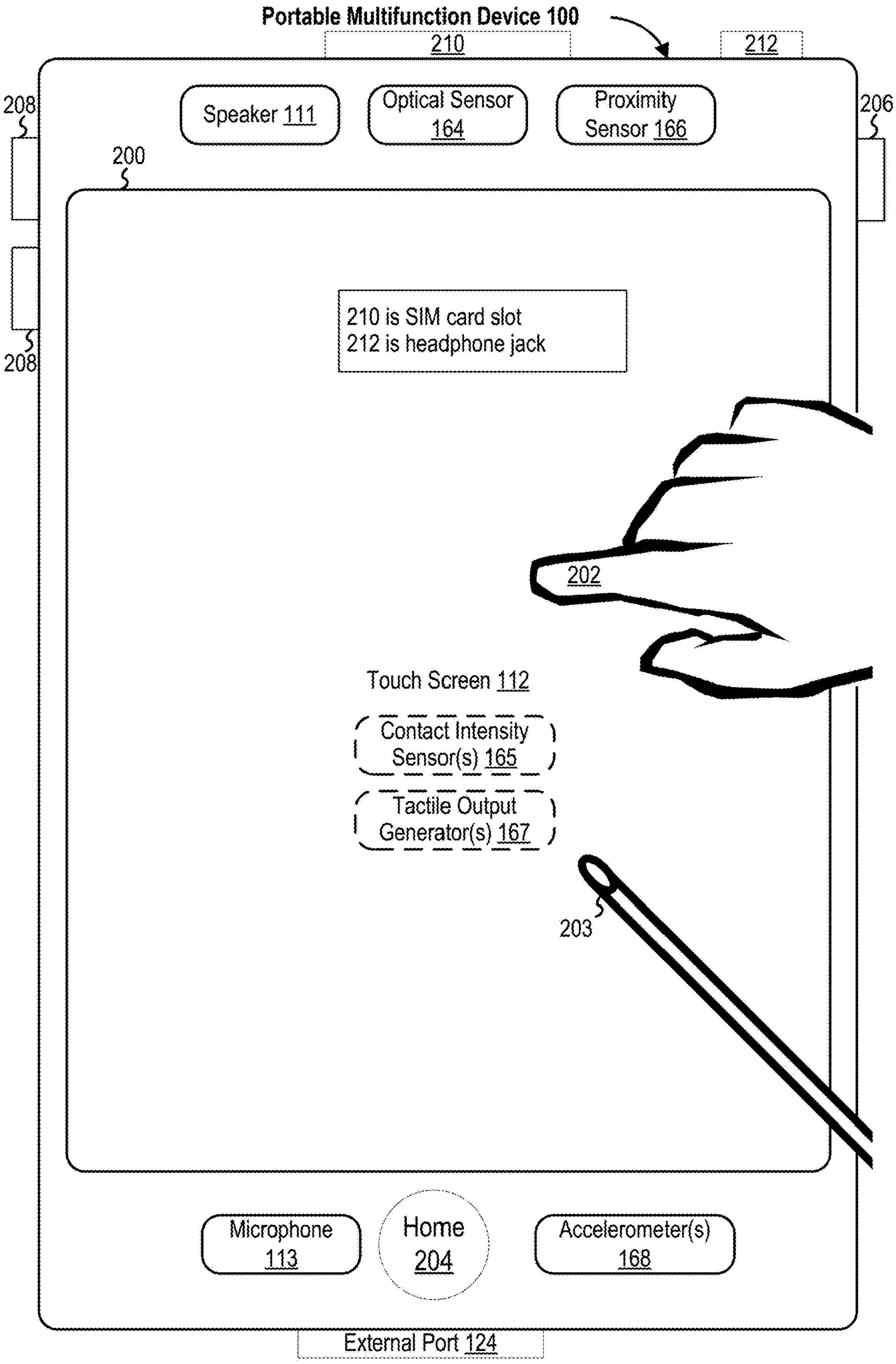
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
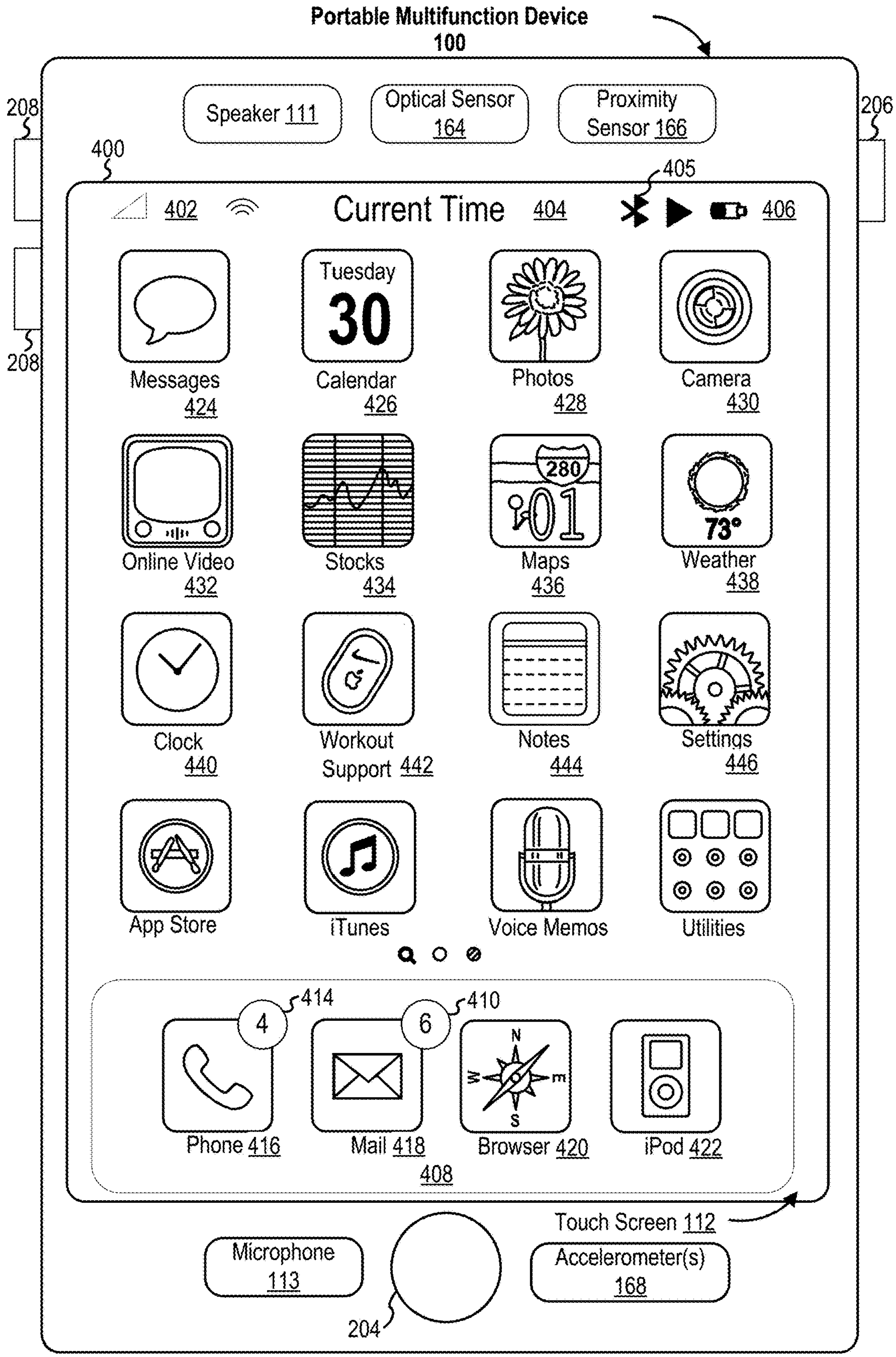
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
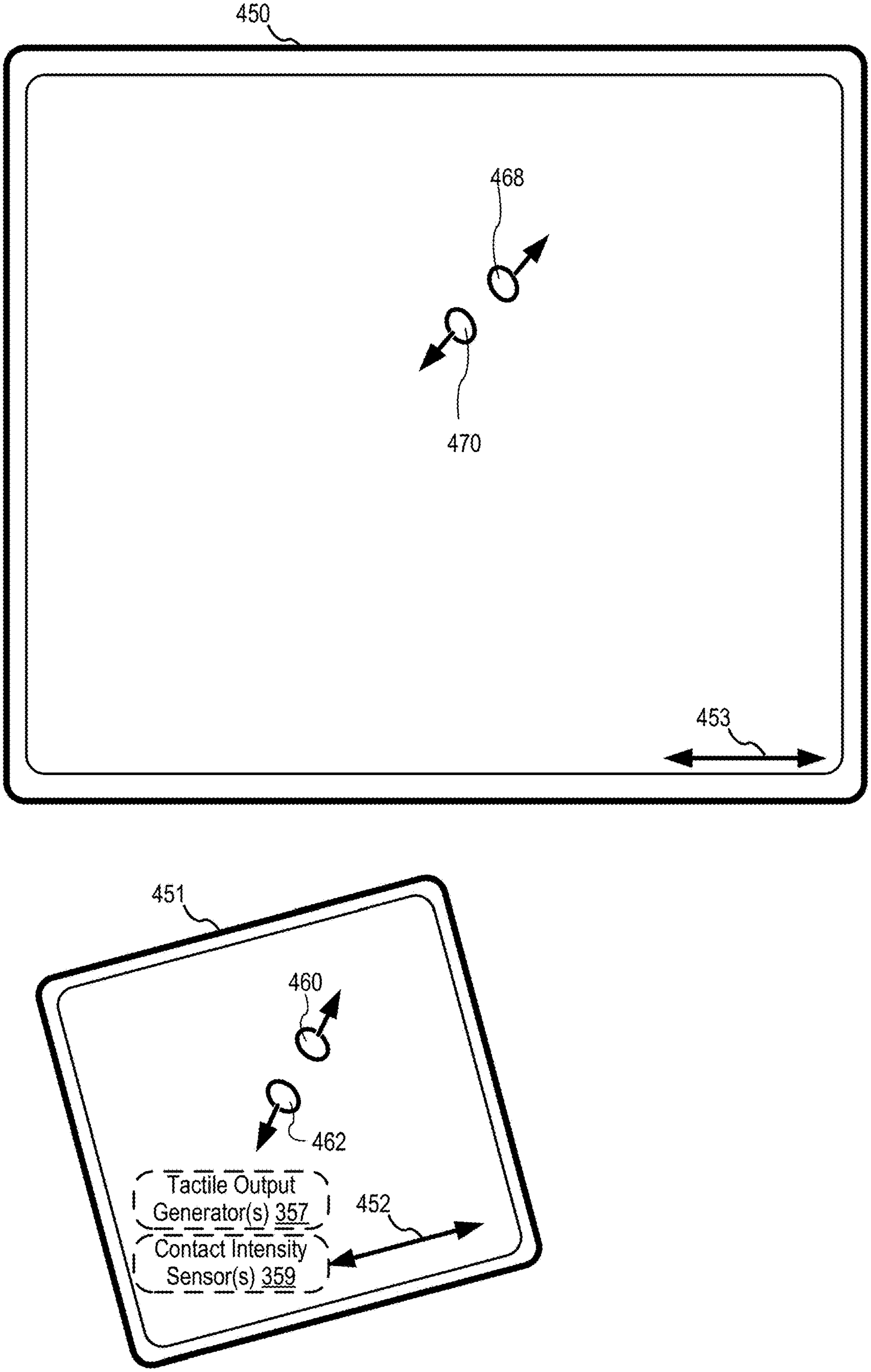
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contact 460 and contact 462, and movements thereof) detected by the device on the touch-sensitive surface (e.g., touch-sensitive surface 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
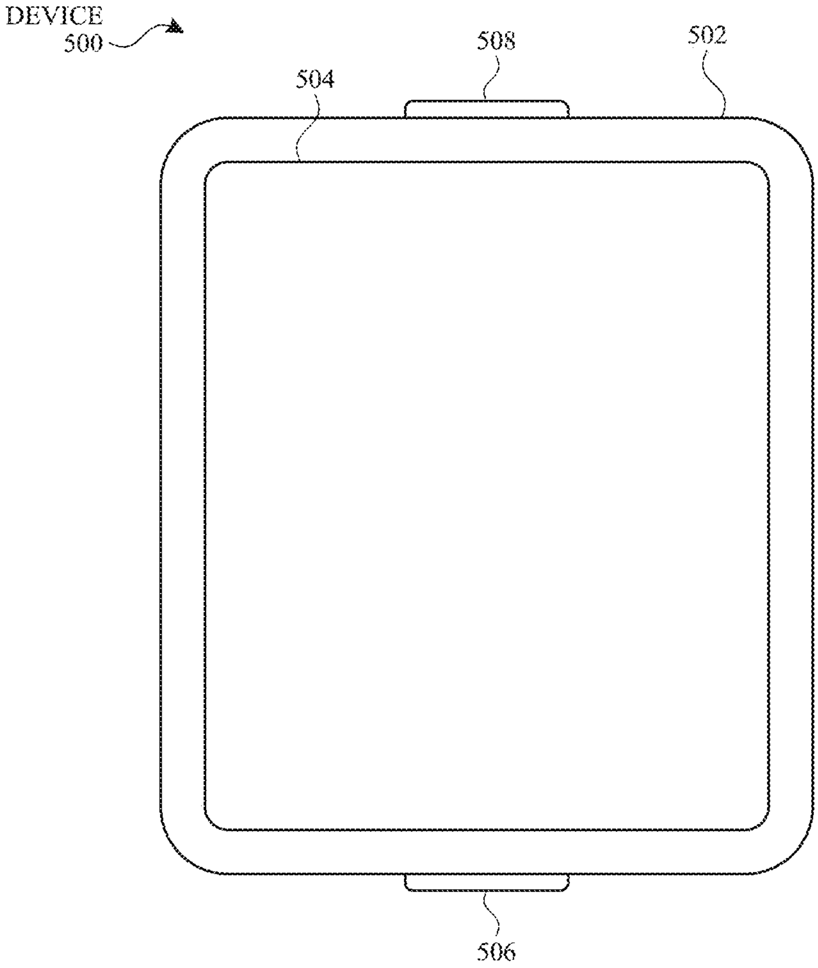
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
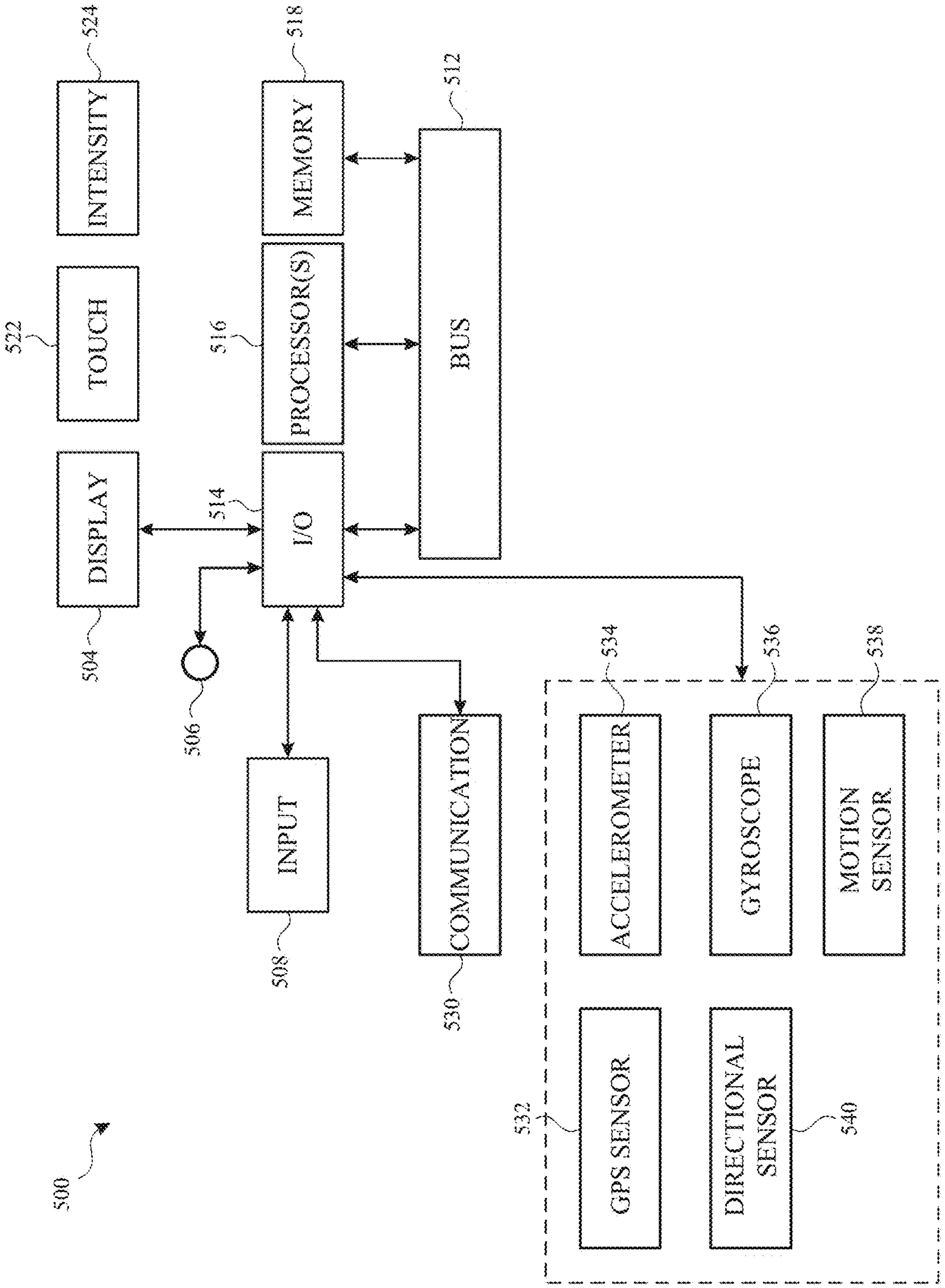
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 800 (FIG. 8). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIG. 6 illustrates charging profiles for three different charging modes: basic charging mode 602, first charging mode 604, and second charging mode 606. In basic charging mode 602, a battery (e.g., a battery of a mobile electronic device such as a smart phone, a smart watch, a tablet computer, or a laptop computer) is continuously charged by a power source (e.g., a wired or wireless charger), until the battery reaches a current maximum capacity (e.g., 100%). In some embodiments, the charging percentages referenced herein refer to a percentage of a current maximum capacity of a battery, which can change (e.g., drop) over time. In some embodiments, the basic charging mode is referred to as an unmanaged charging mode. In first charging mode 604, a battery is charged to 80% of a current maximum capacity and then charging is stopped at 80% (e.g., rather than continuing to charge to 100%), even while a power source remains connected and available to charge the battery further. In some embodiments, first charging mode 604 can mitigate loss of battery life (e.g., by limiting the battery being overcharged and/or maintained at a high level of charge for an extended amount of time), while having little or no negative effect on a user when anticipated battery usage before a subsequent charge cycle is less than 80%. In some embodiments, first charging mode 604 stops charging at a level other than 80% (e.g., 70%, 75%, 85%, 90%, or 95%) that is less than the current maximum capacity. In second charging mode 606, a battery is charged to 80%, charging is paused for a period of time (e.g., a predetermined period of time), before charging is resumed at a subsequent time, at which point charging continues until the battery is charged to its current maximum capacity. In some embodiments, second charging mode 606 can mitigate loss of battery life by limiting the amount of time that the battery is held at a high level of charge. In some embodiments, second charging mode 606 pauses charging at a level other than 80% (e.g., 70%, 75%, 85%, 90%, or 95%) that is less than the current maximum capacity, before later charging to the maximum capacity. In some embodiments, a device (e.g., device 701 of the embodiment of FIGS. 7A-7R) is configured to adaptively switch (e.g., based on historical usage data) between first charging mode 604 and second charging mode 606, as discussed in more detail with reference to FIGS. 7A-7R, especially at FIG. 7K. The charging profiles and charging modes illustrated in FIG. 6 are helpful in understanding the techniques and user interfaces of the embodiment of FIGS. 7A-7R.

FIGS. 7A-7R illustrate exemplary user interfaces for managing charging of an energy storage component (e.g., a battery, capacitor, or other energy storage component) a device, in accordance with some embodiments. The user interfaces in these figures are used to illustrate the processes described below, including the processes in FIG. 8.

FIG. 7A illustrates device 700, a smart phone, displaying user interface 704 on display 702. In the embodiment of FIGS. 7A-7R, device 700 is connected to device 701 (see, e.g., FIG. 7B) and is being used to setup and/or otherwise configure device 701. In some embodiments, device 700 includes one or more features of device 100, 300, and/or 500. User interface 704 is an information interface shown during a setup process for device 701, where one or more aspects of the setup process for device 701 are managed via device 700. In some embodiments, the setup process is a new device setup process for device 701. In some embodiments, the setup process occurs during a software update (e.g., an operating software update) for device 701. User interface 704 includes text 706 and alternative charge icon 708. Text 706 indicates that alternative charge icon 708 is associated with an adaptive charging mode that can preserve battery life over time. Alternative charge icon 708 includes a charge status indicator portion 708*a* that is filled to indicate a current level of charge of a battery (e.g., as discussed in more detail below at FIG. 7B) and an end charge indicator portion 708*b* (which has an appearance that is referred to as a dog ear, due to its shape) that indicates that charging, in first charging mode 604, will end at less than the maximum charging capacity (e.g., end at 80%). In the embodiment of FIGS. 7A-7R, the adaptive charging mode and alternative charge icon 708 are associated with and/or indicate that first charging mode 604 is the currently enabled charging mode (e.g., when battery charging is actively occurring) or that first charging mode 604 is selectively available for use (e.g., when battery charging is not currently occurring), as discussed in more detail below with reference to FIG. 7K.

Figure 7B:
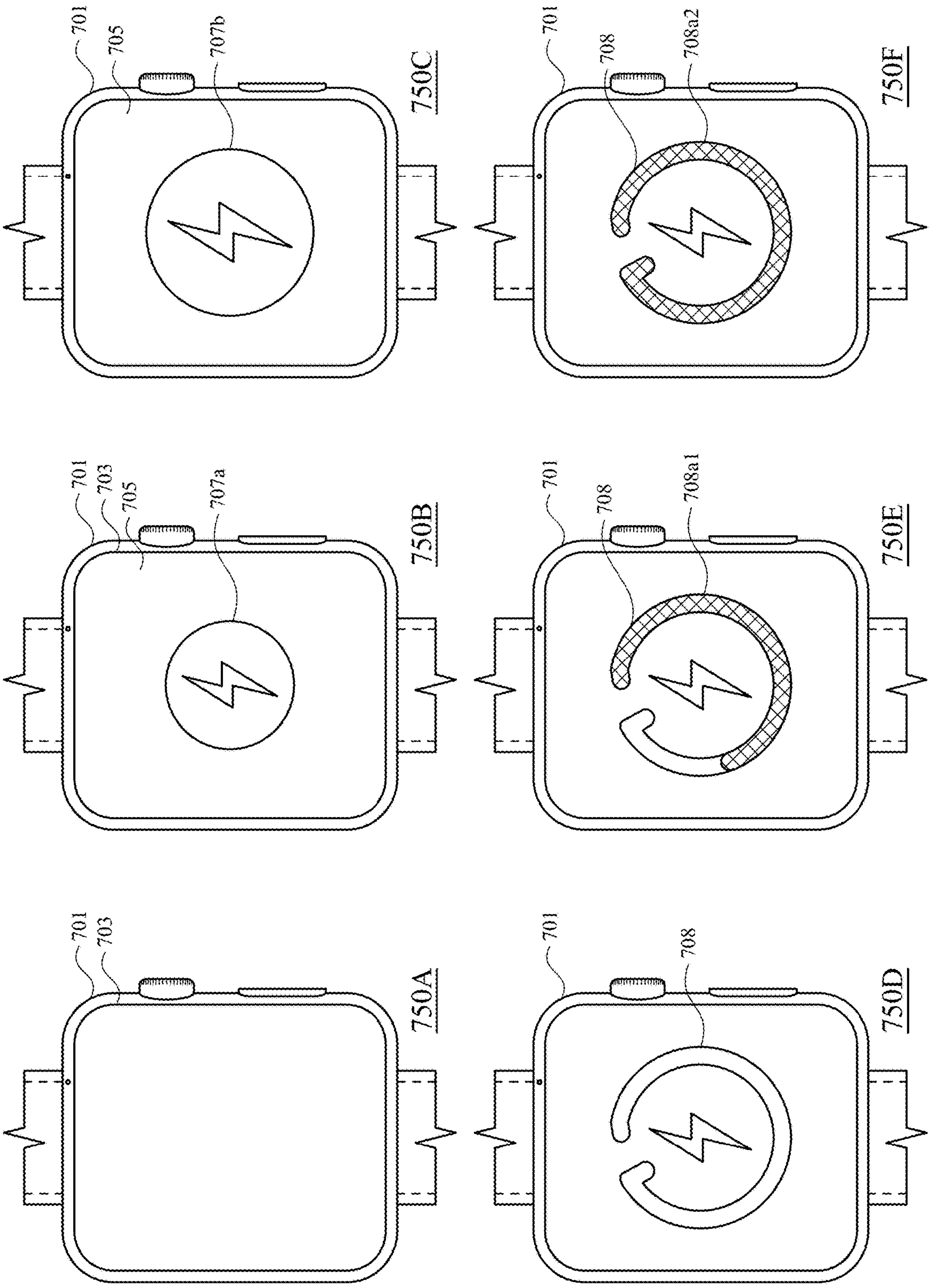

FIG. 7B illustrates device 701, a smart watch, displaying various stages of charge connection interface 705 on display 703, which is touch-sensitive. In some embodiments, device 701 includes one or more features of devices 100, 300, and/or 500.

FIG. 7B, at 750A, illustrates device 701 being connected to a power source (e.g., a wired or wireless charger); display 703 is in an inactive state at the time of initial connection to the power source. At 750B, in response to being connected to the power source, device 701 activates display 703 and displays a first stage (e.g., an initial stage of an animation) of charge connection interface 705 that includes first stage charging icon 709*a*, indicating that charging has started. At 750B, device 701 shows an animation of first stage charging icon 707*a* expanding to second stage icon 707*b*. At 750C, device 701 shows an animation of second stage charging icon 707*b* transitioning to alternative charge icon 708, indicating that first charging mode 604 is the currently enabled charging mode. At 750D, device shows an animation of alternative charge icon 708 being filled with first battery level indication 708*a*1 that indicates a current battery level (e.g., 65%) of the battery of device 701. At 750F, which shows device 701 after charging has progressed for a period of time, device 701 displays alternative charge icon 708 filled with second battery level indication 708*a*2 that indicates that the current battery level is 80% (as indicated by alternative charge icon 708 being completely filled). At 750F, device 701 is still connected to the power source, but charging of the battery of device 701 has stopped because first charging mode 604 is active and the predetermined charging limit of 80% has been reached.

Figure 7C:
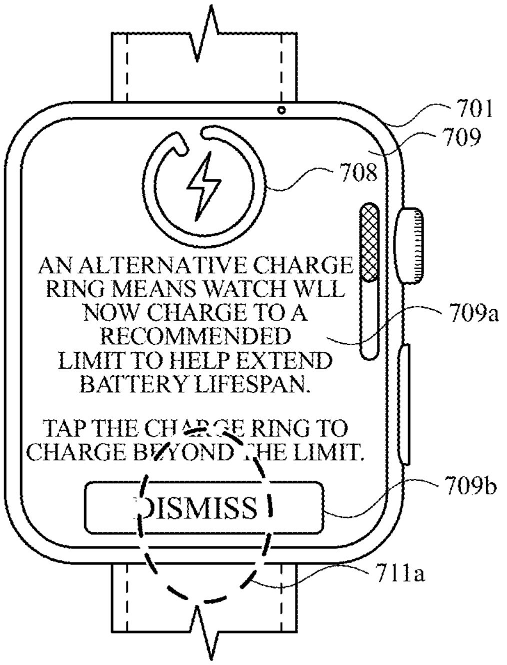

At FIG. 7C, device 701 displays user interface 709, which includes text 709*a* and alternative charge icon 708. Text 709*a*, similar to text 706 of FIG. 7A, indicates that alternative charge icon 708 is associated with an adaptive charging mode that can preserve battery life over time. In some embodiments, user interface 709 is displayed when device 701 detects (e.g., via detecting a touch, via a motion sensor, and/or via a camera) that a user of device 701 is interacting with device 701 for the first time while it is being charged after first charging mode 604 has been enabled on device 701 (e.g., after the setup process described with reference to FIG. 7A). In some embodiments, user interface 709 is displayed during an interaction that occurs at the start of a charging cycle, while the charging cycle is ongoing, or at the end of a charging cycle (e.g., when the user disconnects the charger from the power supply). In some embodiments, user interface 709 is not displayed on subsequent interactions of the user with device 701 while it is being charged, after it is displayed once. At FIG. 7C, device 701 detects input 711*a* (e.g., a tap with a finger) on dismiss icon 709*b* of user interface 709.

Figure 7D:
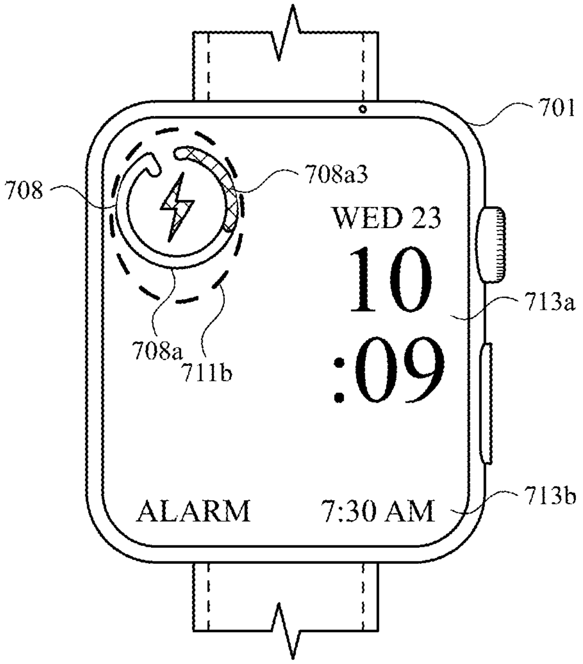

At FIG. 7D, in response to input 711*a*, device 701 displays charging clock user interface 713 that is displayed when device 701 is connected to a power source and oriented in predetermined orientation (e.g., an orientation in which display 703 is substantially perpendicular to the ground). Charging clock user interface 713 includes an indication of time 713*a* and an alarm indication 713*b*. Charging clock user interface 713 also includes alternative charge icon 708 which, in FIG. 7D, is filled with third battery level indication 708*a*3 that indicates that device 701 is currently at 35% charge (e.g., based on how much of charge status indicator portion 708*a* is filled). Thus, in FIG. 7D, alternative charge icon 708 indicates that device 701 is currently being charged using first charging mode 604 and is currently at 35%. Device 701 detects input 711*b* (e.g., a tap, long press, click, or other selection input) on alternative charge icon 708.

Figure 7E:
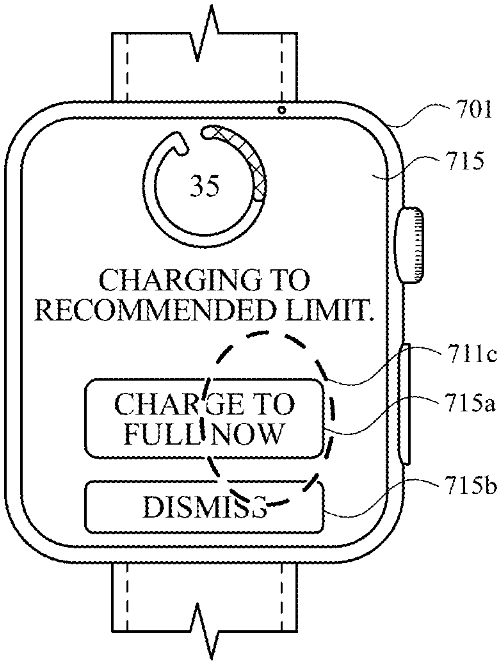

At FIG. 7E, in response to input 711*b*, device 701 displays user interface 715 that includes charge to full option 715*a*. User interface 715 also includes dismiss option 715*b* that, when selected, causes device 701 to redisplay charging clock user interface 713, while remaining in first charging mode 604. Device 701 detects input 711*c* (e.g., a tap, long press, click, or other selection input) on charge to full option 715*a*.

Figure 7F:
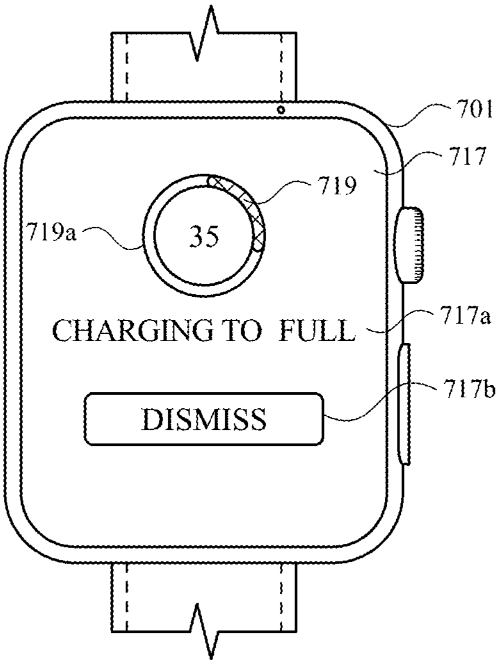

At FIG. 7F, in response to input 711*c*, device 701 displays user interface 717, which indicates that device 701 has transitioned to charging with basic charging mode 602 via text 717*a* and full charge icon 719. Full charge icon 719 includes charge status indicator portion 719*a* that is filled to indicate a current level of charge of the battery (e.g., in a similar manner to charge status indicator portion 708*a* of alternative charge icon 708 as discussed with reference to FIG. 7A). In contrast to alternative charge icon 708, full charge icon 719 does not include end charge indicator portion 708*b*, as charging will continue to maximum charging capacity when in basic charging mode 602. In some embodiments, a user can choose to charge to full, rather than the adaptive charging level, because the user anticipates requiring additional battery power. In some embodiments, the transition to basic charging mode 602 is effective only for the current charging cycle (e.g., while device 701 continues to be connected to the power supply) and device 701 will return to first charging mode 604 upon subsequent charging cycles. User interface 717 also includes dismiss option 717*b* that, when selected, causes device 701 to redisplay charging clock user interface 713 (e.g., with full charge icon 719 rather than alternative charge icon 708).

Figure 7G:
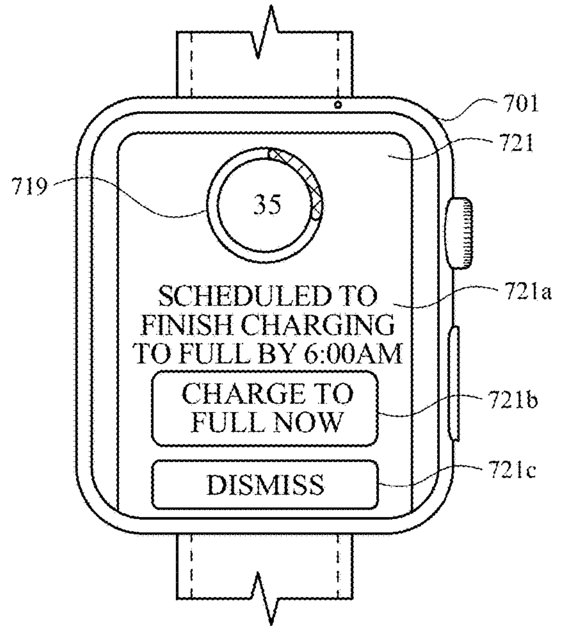

In some embodiments, as shown in FIG. 7G, in response to input 711*c*, device 701 displays user interface 721 and transitions to second charging mode 606 (e.g., rather than basic charging mode 602), as both basic charging mode 602 and second charging mode 606 will charge device 701 to full (e.g., to maximum current battery capacity), though at different rates. User interface 721 includes text 721*a* that indicates that the battery of device 701 will be charged to maximum capacity by a predetermined time of 6 AM (e.g., after a pause in charging upon reaching 80% charge). In some embodiments, the predetermined time is selected based on a usage history of device 701 and/or a currently set alarm time. User interface 721 also includes full charge icon 719, which is common to both basic charging mode 602 and second charge mode 606. In some embodiments, different, distinguishable icons are used to represent basic charging mode 602, first charging mode 604, and second charging mode 606. User interface 721 also include full charge icon 721*b* that, when selected, causes device 701 to transition from second charging mode 606 to basic charging mode 602. User interface 717 also includes dismiss option 721*c* that, when selected, causes device 701 to redisplay charging clock user interface 713 (e.g., with full charge icon 719 rather than alternative charge icon 708).

Figure 7H:
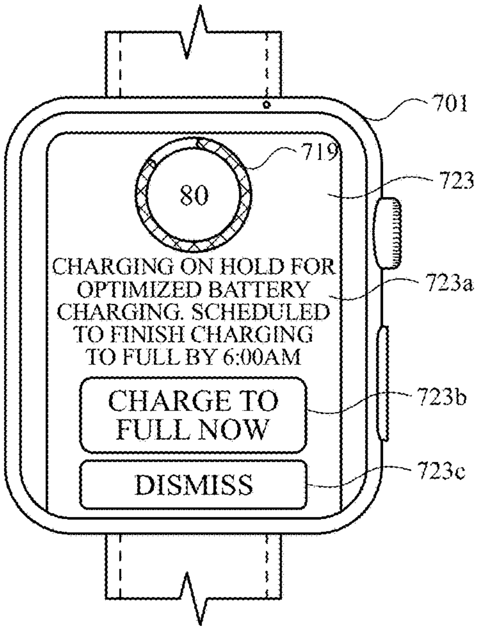

At FIG. 7H, device 701 displays user interface 723, which is displayed in response to the user interacting with device 701 while charging is paused during second charging mode 606 before continuing to full charging capacity. User interface 723 includes text 723*a* that explains charging is paused and full charge icon 719 that indicates device 701 is charged to 80% (e.g., the level at which charging is paused for a predetermined time). User interface 723 also includes full charge icon 723*b* that, when selected, causes device 701 to immediately resume charging to the maximum charging capacity. User interface 717 also includes dismiss option 723*c* that, when selected, causes device 701 to redisplay charging clock user interface 713 (e.g., with full charge icon 719 rather than alternative charge icon 708).

Figure 7I:
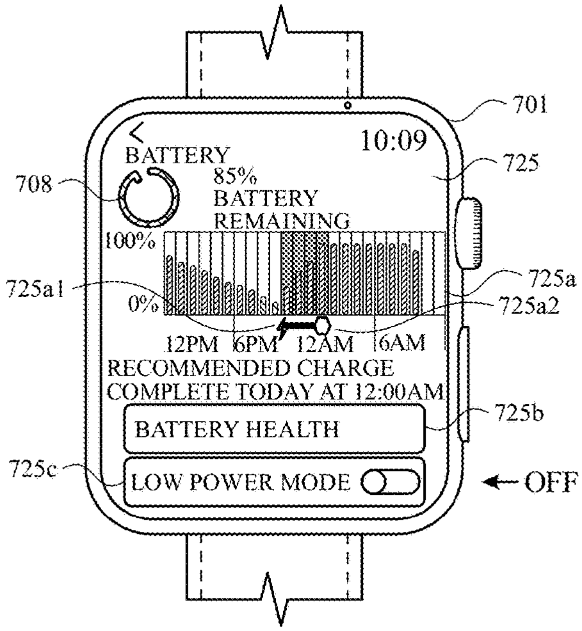

At FIG. 7I, device 701 displays battery setting interface 725 that includes graph 725*a* that displays battery status for a preceding period of time (e.g., the previous 12, 18, or 24 hours), battery health icon 725*b* (discussed in more detail with reference to FIG. 7J), and low power mode toggle 725*c*. As seen in graph 725*a*, the previous charging cycle, which started at 9 PM (e.g., as indicated by charge start icon 725*a*1) and stopped at 12 AM (e.g., as indicated by charge stop icon 725*a*2) occurred while device 701 was configured to use first charging mode 604, as indicated by charging stopping at 80%. Graph 725*a* also shows that the user began using the device again at approximately 8 AM, when battery charge began to drop below 80%. Battery setting interface 725 also includes alternative charge icon 708 that indicates that device 701 is currently still configured to charge based on first charge mode 604. Low power mode toggle 725*c*, when selected, causes device 701 to transition to a power conservation mode during which one or more functions are disabled or operated in a lower power mode, in order to conserve existing battery power.

Figure 7J:
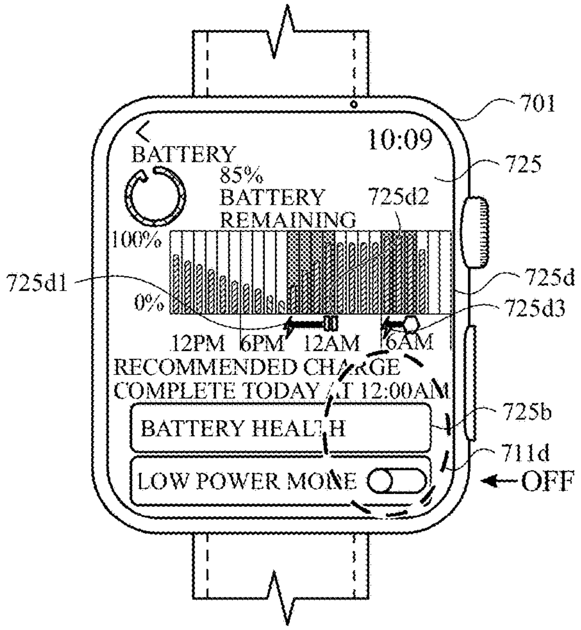

At FIG. 7J, device 701 displays battery setting interface 725 on a different date (but at the same time of day), as compared to FIG. 7I. At FIG. 7J, battery setting interface 725 includes graph 725*d* that shows a previous charging cycle that occurred while device 701 was configured according to second charging mode 606. In graph 725*d*, charging started at 9 PM (e.g., as indicated by charge start icon 725*d*1), paused at 12 AM when 80% charge was reached (e.g., as indicated by charge pause icon 725*d*2), and resumed again at 6 AM (e.g., as indicated by charge resume icon 725*d*3), before reaching 100% shortly thereafter at approximately 7 AM. Battery setting interface 725 also includes alternative charge icon 708 that indicates that device 701 is currently configured to charge using first charging mode 604 (e.g., because the transition to second charging mode 606 (e.g., via selection of charge to full icon 715*a*) was only for a single cycle. At FIG. 7J, device 701 detects input 711*d* (e.g., a tap, long press, click, or other selection input) on battery health icon 725*b*.

Figure 7K:
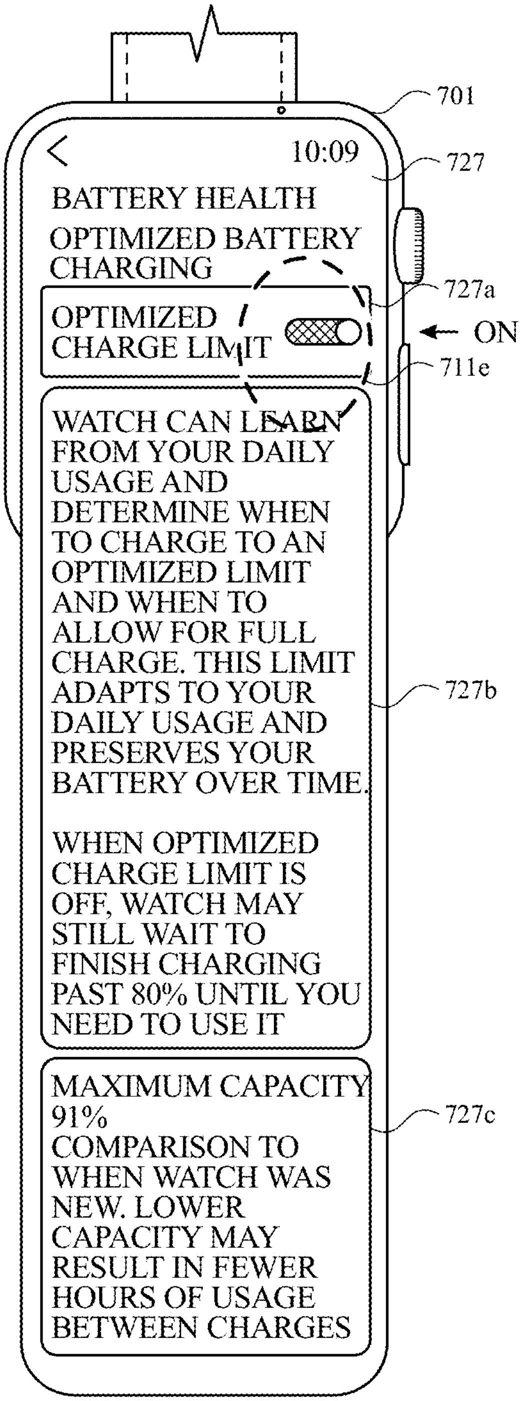

At FIG. 7K, in response to input 711*d*, device 701 displays battery health interface 727 that includes optimized charge limit toggle 727*a*, text 727*b*, and text 727*c*. Optimized charge limit toggle 727*a*, when "on" (as in FIG. 7K), configures device 701 to adaptively switch between first charging mode 604 and second charging mode 606 (in some embodiments, between first charging mode 604, second charging mode 606, and basic charging mode 602). In some embodiments, when the optimized charge limit feature is on (e.g., optimized charge limit toggle 727*a* is set to "on"), device 701 selects between using first charging mode 604 and second charging mode 606 based on historical usage data for device 701 and/or based on historical usage patterns of a user associated with device 701 (e.g., usage patterns for device 701 itself and/or usage patterns for other devices (e.g., device 700) that are predictive of usage patterns for device 701). For example, when the history of usage indicates that for the next use period (e.g., next day (e.g., a Monday)) the user typically begins the next charging cycle before the battery of device 701 is discharged by more 70% of its current maximum capacity, indicating that first charge mode 604 can be used because the battery can be charged to 80% capacity without a likelihood that the battery will be fully discharged prior to the next charging cycle. On the other hand, if for the subsequent use cycle (e.g., the following day (e.g., a Tuesday)), the history of usage indicates that the user typically does not begin the next charging cycle before the energy storage component is discharged by at least 90% (e.g., because the user consistently works longer days on Tuesdays than on Mondays), then device 701 is configured to use second charge mode 606 to avoid the likelihood that the battery will be fully discharged prior to the next charging cycle. In some embodiments, when the optimized charge limit feature is off (e.g., optimized charge limit toggle 727*a* is set to "off"), device 701 is configured to charge according to second charge mode 606 only or device 701 selects between using basic charging mode 602 and second charging mode 606 (e.g., based on historical usage data), such that the battery of device 701 is consistently charged to 100% (e.g., first charge mode 604 is not available). At FIG. 7K, device 701 detects input 711*e* (e.g., a tap, long press, click, or other selection input) on optimized charge limit toggle 727*a*.

Figure 7L:
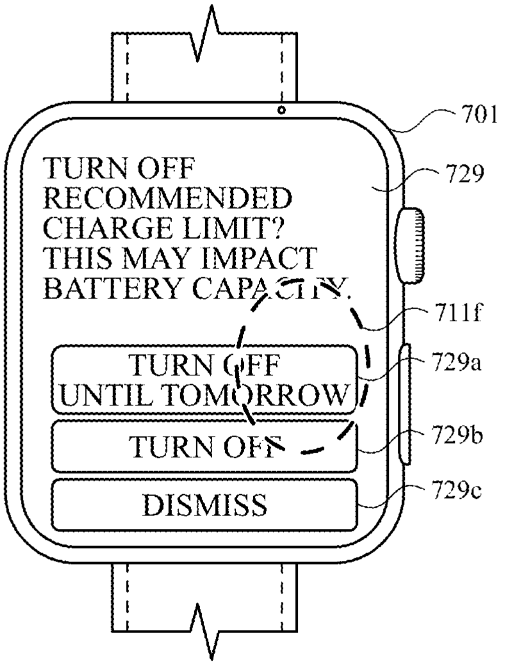

At FIG. 7L, in response to input 711*e*, device 701 displays user interface 729 that includes temporary off icon 729*a*, indefinite off icon 729*b*, and dismiss icon 729*c*. Indefinite off icon 729*b*, when selected, configures device 701 to charge according to second charge mode 606 only or configures device 701 to select between using basic charging mode 602 and second charging mode 606 (e.g., based on historical usage data), such that the battery of device 701 is consistently charged to 100% (e.g., disables use of first charge mode 604). Dismiss icon 729*c*, when selected, causes device 701 to re-display battery health interface 727, without disabling the optimized charge limit feature (e.g., leaving optimized charge limit toggle 727*a* set to "on"). At FIG. 7L, device 701 detects input 711*f* (e.g., a tap, long press, click, or other selection input) on temporary off icon 729*a*.

Figure 7M:
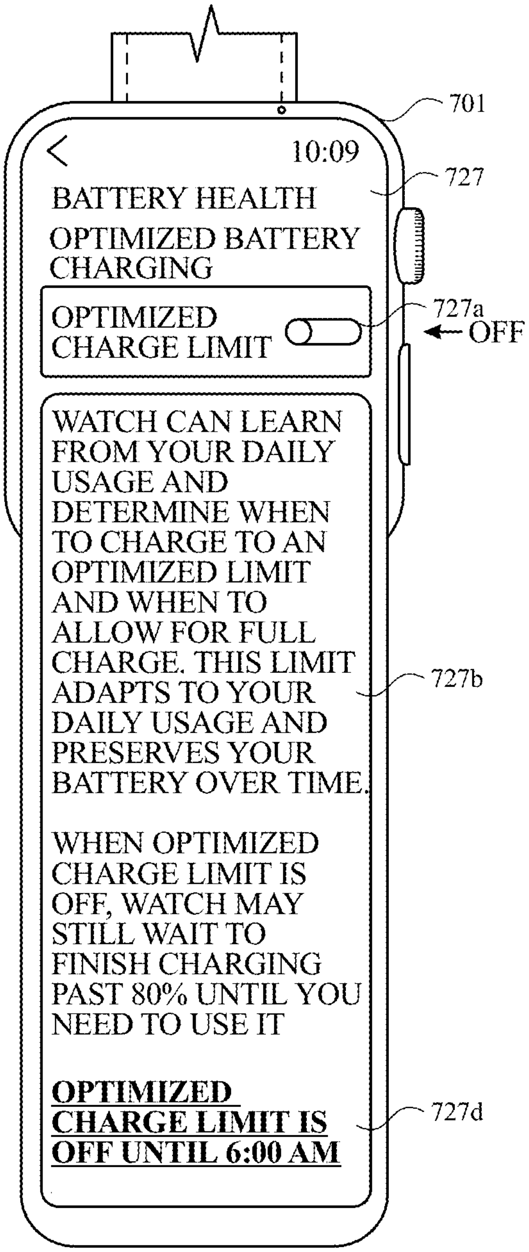

At FIG. 7M, in response to input 711*f*, device 701 re-displays battery health interface 727, with optimized charge limit toggle 727*a* set to "off". Because the optimized charge limit feature is only temporarily disabled, battery health interface 727 now also includes text 727*c* that indicates that the feature has been disabled until 6 AM of the follow day, after which device 701 will automatically re-enables the optimized charge limit feature. Had indefinite off icon 729*b* been selected instead of temporary off icon 729*a*, device 701 would re-display battery health interface 727 with optimized charge limit toggle 727*a* set to "off" and without text 727*d*.

Figure 7N:
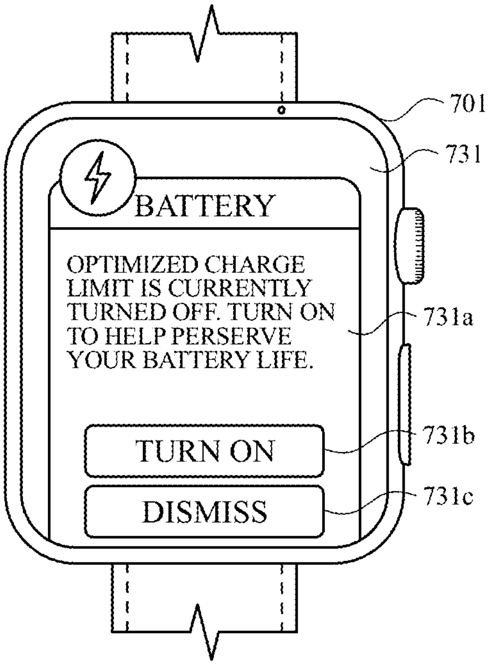

At FIG. 7N, while the optimized charge limit feature is indefinitely off (e.g., in response to selection of indefinite off icon 729*b* of FIG. 7L), device 701 displays notification user interface 731 that includes text 731*a*, turn on icon 731*b*, and dismiss icon 731*c*. Text 731*a* indicates that the optimized charge limit feature is indefinitely off (e.g., first charge mode 604 is indefinitely unavailable). Turn on icon 731*b*, when selected, enables the optimized charge limit feature (e.g., makes first charge mode 604 available for use). Dismiss icon 731*c*, when selected, causes device 701 to cease to display notification user interface 731, while keeping the optimized charge limit feature indefinitely off In some embodiments, notification user interface 731 is displayed after the optimized charge limit feature has been disabled for a predetermined period of time (e.g., 1 week, 2 weeks, or 1 month). In some embodiments, notification user interface 731 is displayed if usage data for device 701 and/or the usage history for the user of device 701 indicates a usage pattern that would be compatible with usage of first charge mode 604 (e.g., device 701 is frequently re-charged before the battery drops below 20%).

Figure 7O:
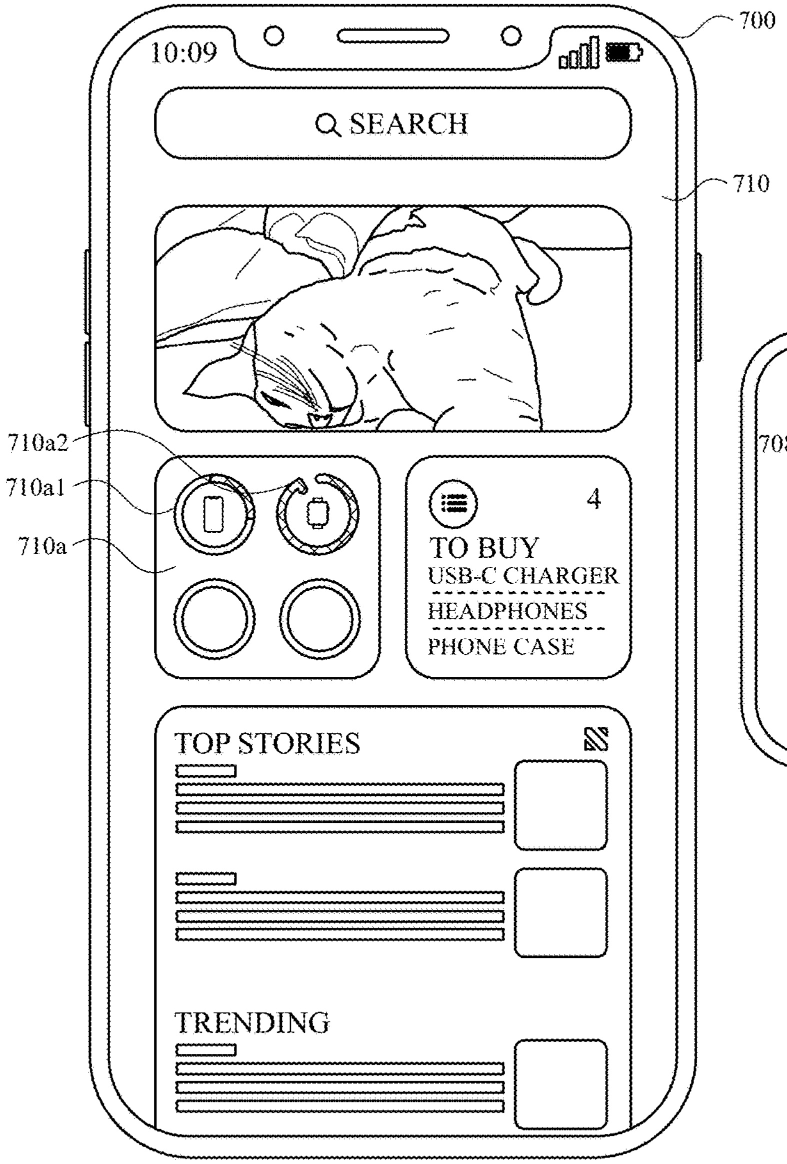

At FIG. 7O, device 700 displays a today user interface 710 that aggregates curated, customized, and/or contextually relevant information for a user of device 700, who is also a user of device 701. Today user interface 710 includes battery widget 710*a* that provides a summary of battery power for mobile devices associated with the user. In FIG. 7O, battery widget 710*a* includes phone battery icon 710*a*1 that indicates a current battery level of device 700 (approximately 25%). Battery widget 710*a* also includes watch battery icon 710*a*2 that indicates a current battery level of device 701 (approximately 80%) and also indicates that device 701 is configured to charge using first charging mode 604 (in some embodiments, is configured such that first charging mode 604 is available for use, depending on usage patterns). Thus, a user of devices 700 and 701 can readily determine whether device 701 is currently enabled to use first charging mode 604.

Figure 7P:
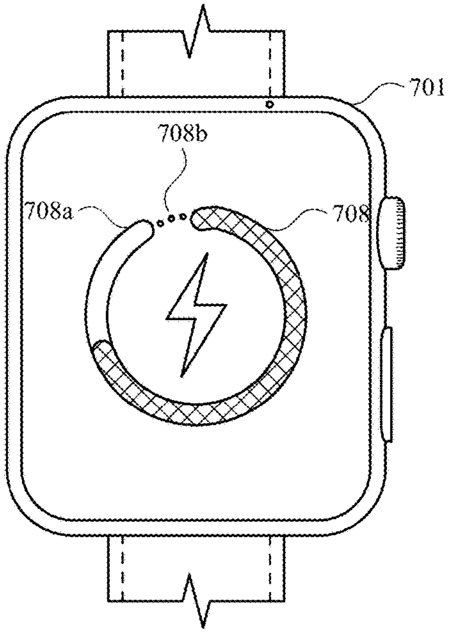
Figure 7Q:
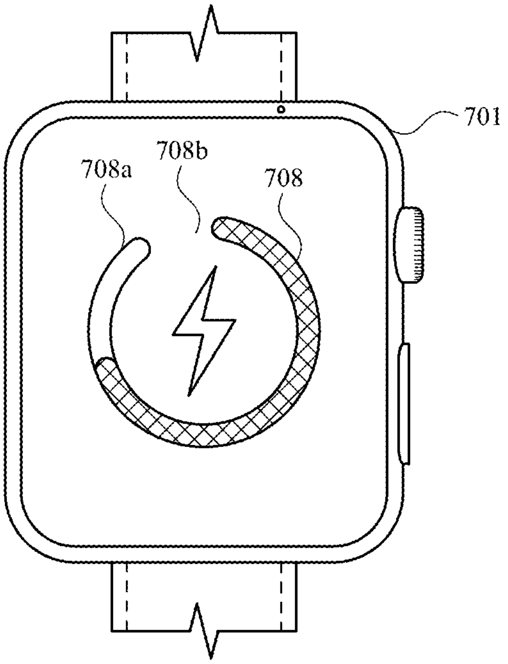

FIGS. 7P and 7Q show alternative visual appearances for alternative charge icon 708, as seen in FIG. 7B at (E), in accordance with some embodiments. For example, alternative charge icon 708 of FIG. 7P includes charge status indicator portion 708*a* that has the same visual appearance of that of FIG. 7B at (E), but with a visually different end charge indicator portion 708*b* that has the appearance of multiple dots. Alternative charge icon 708 of FIG. 7Q similar has a different end charge indicator portion 708*b* that has the appearance of a gap.

FIG. 7R, at (A)-(D) show alternative visual appearances for alternative charge icon 708, as seen in FIG. 7D. At (A), end charge indicator portion 708*b* has the appearance of a single hollow dot. At (B), end charge indicator portion 708*b* has the appearance of a single filled in dot. At (C), end charge indicator portion 708*b* has the appearance of stylized lightning bolt, similar to the appearance of charge start icon 725*a*1 of FIG. 7I. At (D), end charge indicator portion 708*b* has the appearance of a gap, also as seen in FIG. 7Q.

FIG. 8 is a flow diagram illustrating a method for managing charging of a device using a computer system in accordance with some embodiments. Method 800 is performed at a computer system (e.g., (e.g. a smart watch, a smart phone, a tablet computer, a personal computer and/or devices 100, 300, 500, 700, and/or 701) with an energy storage component (e.g., an internal or external battery, set of batteries, capacitor, set of capacitors, or other energy storage component of the computer system) and that is in communication with a display generation component (e.g., 702 or 703) (e.g., a display controller, a touch-sensitive display system, a display projector, and/or a display (e.g., integrated into and/or connected to the computer system)). Some operations in method 800 are, optionally, combined, the orders of some operations are, optionally, changed, and some operations are, optionally, omitted.

As described below, method 800 provides an intuitive way for managing charging of a device. The method reduces the cognitive burden on a user for managing charging of a device, thereby creating a more efficient human-machine interface. For battery-operated computing devices, enabling a user to manage charging of a device faster and more efficiently conserves power and increases the time between battery charges.

The computer system (e.g., 700 or 701) displays (802) a user interface (e.g., 709 or FIG. 7B at 750F) (e.g., a charging user interface) that includes a charge status indicator (e.g., 708*a* or 719*a*) (a user interface object that indicates (e.g., textually or graphically) a current charge status of the energy storage component or a configured, future level of charge status of the energy storage component). In some embodiments, the charge status indicator is displayed in accordance with a determination that the computer system is connected to a charger (e.g., a wired or wireless power source).

In accordance with a determination that a first set of one or more charging criteria (e.g., a set of criteria that are used to determine if the computer system will be configured for a first charging mode in which the energy storage component is routinely charged to less than full capacity) are met (804): the computer system is configured (806) to charge the energy storage component to a first charging level (e.g., 80% as seen in 604) (e.g., a charging limit and/or level that is less than the current maximum charging level of the energy storage component (e.g., 70%, 75%, 80%, 85%, or 90% of the current maximum charging capacity of the energy storage component); and (in some embodiments, when the computer system is configured to charge the energy storage component to the first charging level, the computer system will end the current charging cycle once the first charging level is reached); the charge status indicator is displayed with (e.g., the charge status indicator includes or is displayed (808) in conjunction with (e.g., adjacent to or connected to)) a first end charge indication (e.g., 708*b*) that indicates (e.g., graphically and/or textually indicates) that charging of the energy storage component will end (e.g., end even though a power source is still connected and available to charge the energy storage component beyond the first charging level) before the energy storage component is charged above the first charging level.

In accordance with the determination that a second set of one or more charging criteria are met (810) (in some embodiments, the second set of one or more charging criteria are met when the first set of one or more charging criteria are not met and the computer system will be configured for a second charging mode in which the energy storage component is routinely charged to full capacity): the computer system is configured (812) to charge the energy storage component to a second charging level (e.g., 100% as seen in 602 or 606) that is higher than the first charging level (in some embodiments, the second charging level is, or is based on, the current maximum charging level (e.g., the current, actual maximum charging level (e.g., as determined by the chemistry of a battery, which can change over time)) for the energy storage component (in some embodiments, the second charging level is, or is based on, the theoretical maximum charging level for the energy storage component); and the charge status indicator is displayed (814) without the first end charge indication (e.g., as in 719) (e.g., the charge status indicator does not include, as part of the charge status indicator, the first end charge indication and/or the first end charge indication is not concurrently displayed with the charge status indicator). In some embodiments, displaying the charge status indicator without the first end charge indication includes displaying the charge status indicator with a second end charge indication, different from the first end charge indication, that indicates (graphically and/or textually) that the charging of the energy storage component will continue above the first charging level (e.g., will continue to the second charging level). Configuring the computer system to charge the energy storage component to a first charging level or a higher second charging level based on sets of charging criteria can help to extend the operational life of the energy storage component by not overcharging the component, when the higher level of charge is not needed. Doing so enhances the operational life of the computer system and helps to extend user-system interactions, which enables the user to use the system more often and over a longer period of time. Displaying the charge status indicator with or without the first end charge indication based on the sets of charging criteria provides feedback to the user as to which charging level is currently in effect and also alerts the user to the existence of additional energy storage capacity that could be used, if need, both of which provide improved visual feedback.

In some embodiments, displaying the user interface that includes the charge status indicator occurs while the energy storage component is at third charging level that is lower than the first charging level (e.g., as seen in FIG. 7D) (e.g., 25% charge when the first charging level is 80% charge).

In some embodiments, the first end charge indication is displayed at a first location (e.g., intersection of 708*a* and 708*b* in FIG. 7A) (in some embodiments, the charge status indicator includes a first sub-portion that indicates a charged portion (e.g., percentage) of the energy storage component and a second sub-portion that indicates an uncharged and/or a to-be-charged portion of the energy storage component and the first location is at the intersection of the first and second sub-portions) along (e.g., partway along or at an end of the charge status indicator) a path corresponding to the charge status indicator (e.g., along the length of a straight or curved status indicator). In some embodiments, the first end charge indication is overlaid on a portion of the charge status indicator. In some embodiments, the first end charge indication is a portion of the charge status indicator. In some embodiments, the first end charge indication is connected to the charge status indicator. Displaying the first end charge indication partway along the charge status indicator draws a greater association between the indication and the indicator to provide the user with information about the relationship of the indication and the indicator, which provides improved user feedback.

In some embodiments, the first location is partway along the path corresponding to the charge status indicator and the first end charge indication extends at an angle (e.g., a 45°, 75°, or 90° angle) from the path corresponding to the charge status indicator (e.g., as seen in 708 as shown in FIG. 7A) (e.g., the first end charge indication has a length (in some embodiments, a length less than the length of the charge status indicator) that forms an angle with the length of the charge status indicator). A first end charge indication that extends at an angle from the length of the charge status indicator improves the visibility of the first end charge indication and reduces the risk that a user will confuse the first end charge indication with a portion of the charge status indicator, which provides improved visual feedback.

In some embodiments, the first end charge indication includes a plurality of non-contiguous elements (e.g., dots or dashes) that extend along the path corresponding to the charge status indicator at the first location (e.g., as seen in FIG. 7P) (e.g., the first end charge indication is a dotted line).

In some embodiments, the first end charge indication includes a first non-contiguous element (e.g., a dot or a dash that is not connected to a one or more sub-portions of the charge status indicator (e.g., a discrete dot)) at the first location (e.g., as seen in FIG. 7R at (A)).

In some embodiments, the first end charge indication is the absence of a respective sub-portion of the charge status indicator that is visible (e.g., displayed) when the energy storage component is charged above the first charge level (e.g., as seen in FIG. 7Q). In some embodiments, the first end charge indication obscures and/or masks the respective sub-portion of the charge status indicator).

In some embodiments, the charge status indicator, when displayed without the first end charge indication, includes a first sub-portion (e.g., see top of 719); and the charge status indicator, when displayed with the first end charge indication, does not include the first sub-portion (e.g., the first end charge indication is the absence of the first sub-portion or the first end charge indication obscures and/or masks the first sub-portion of the charge status indicator). In some embodiments, the first sub-portion corresponds to a portion of the capacity of the energy storage component that is above the first charging level. In some embodiments, the first sub-portion is displayed, when the first end charge indication is not displayed, whether the computer system is configured to charge past the first charging level (e.g., to the second charging level) or it is not so configured (e.g., configured to charge below the first charging level)). Displaying the charge status indicator with an additional sub-portion when the indicator is displayed without the first end charge indication helps to draw a greater distinction between the status of the indicator when the energy storage component is being charged to the first charging level versus the second charging level, which provides improved visual feedback.

In some embodiments, the charge status indicator is displayed with the first end charge indication while the computer system is connected to an external power source (e.g., a charger and/or a power supply) that is actively charging the energy storage component (e.g., as seen in FIG. 7B). In some embodiments, when the computer system is not connected to an external power that is configured to charge the energy storage component, the first end charge indication (in some embodiments, and the charge status indicator) is not displayed. Displaying the charge status indicator with the first end charge indication while the computer system is connected to an external power source that is actively charging the energy storage component provides the user with feedback, while the energy storage component is being charged, that it is being charged to the first charging level, which provides improved visual feedback.

In some embodiments, the charge status indicator is displayed with the first end charge indication while the energy storage component is not being actively charged (e.g., as seen in FIG. 7I) (e.g., while the computer system is not connected to an external power source or while the computer system is connected to an external power source, but not actively charging the energy storage component (e.g., because the energy storage component has been charged to the first charging level or the second charging level). Displaying the charge status indicator with the first end charge indication while the energy storage component is not being actively charged provides the user with feedback, while the energy storage component is not being charged, that the component will be charged to the first charging level, when charging beings, which provides improved visual feedback.

In some embodiments, the charge status indicator includes a second sub-portion that corresponds to a first portion of the capacity of the energy storage component that is below the first charging level (e.g., from 0% to 80%, when the first charging level is 80%). The charge status indicator includes a third sub-portion that corresponds to a second portion of the capacity of the energy storage component that is above the first charging level (e.g., 80% to maximum available charge capacity, when the first charging level is 80%) (e.g., a portion of the capacity of the energy storage component that will not be charged when the computer system is configured to charge the energy storage component to the first charging level). Displaying the charge status indicator without the first end charge indication includes displaying the third sub-portion of the charge status indicator with a first visual appearance (e.g., with a first color, a first pattern, and/or a first level of opacity) (in some embodiments, a visual appearance that is the same as that of the second sub-portion of the charge status indicator); and displaying the charge status indicator with the first end charge indication includes displaying the third sub-portion of the charge status indicator with a second visual appearance, different from the first visual appearance (e.g., as seen in FIG. 7B at 750F). In some embodiments, displaying the first end charge includes modifying the visual appearance of the third sub-portion of the charge status indicator. Modifying the visual appearance of the third sub-portion of the charge status indicator when it is displayed with versus without the first end charge indication provides the user with more visible feedback as to the current charging level of the energy storage component, which provides improved visual feedback.

In some embodiments, the charge status indicator is a path where an end of the path is at or near a beginning of the path (e.g., 708*a*) (e.g., a full or partial ellipse or circle such as a ring or a contiguous ring); a first portion of the path corresponds to a third portion of the capacity of the energy storage component that is below the first charging level (e.g., from 0% to 80%, when the first charging level is 80%); a second portion of the path that corresponds to a fourth portion of the capacity of the energy storage component that is above the first charging level (e.g., 80% to maximum available charge capacity, when the first charging level is 80%) (e.g., a portion of the capacity of the energy storage component that will not be charged when the computer system is configured to charge the energy storage component to the first charging level); a first end of the second portion of the path corresponds to a maximum current charging capacity of the energy storage component (e.g., intersection of 708*a* and 708*b* as seen in FIG. 7B at 750F) (e.g., the current, actual maximum charging level (e.g., as determined by the chemistry of a battery, which can change over time) to which the storage component can be set to charge); and the first end charge indication, when displayed, is displayed at a first end (e.g., an end that is adjacent to or connected to the second portion of the path) of the first portion of the path that corresponds to the first charging level.

In some embodiments, the determination that the first set of one or more charging criteria are met is a determination made by the computer system (e.g., an automatic determination rather than a an explicit, user-made determination and/or selection); and the determination that the second set of one or more charging criteria are met is a determination made by the computer system (e.g., as discussed with reference to FIG. 7K). Having the computer system determine whether the sets of charging criteria are met allows the computer system to adjust the charging level, as appropriate (e.g., to help to extend the operational life of the energy storage component). Doing so enhances the operational life of the computer system and helps to extend user-system interactions, which enables the user to use the system more often and over a longer period of time.

In some embodiments, the first set of one or more charging criteria includes a first criterion that is based on a first set of history of usage (e.g., history of usage in the last day, last week, last month, or last year or history of usage for a recurring period of time (e.g., history of usage on Mondays or weekends)) of the computer system (e.g., usage pattern by a user of the computer system and/or usage behavior of the user) over time (e.g., as discussed with reference to FIG. 7K). ISE wherein the first charging level is 80% of the current maximum capacity of the energy storage component, the first set of one or more charging criteria is met when the history of usage indicates that for the next use period (e.g., next day (e.g., a Monday)) the user typically begins the next charging cycle before the energy storage component is discharged by more 70% (ISE 50%, 30%, or 20%) of its current maximum capacity, indicating that the component can be charged to 80% capacity without a likelihood that the energy storage component will be fully discharged prior to the next charging cycle. On the other hand, if for the subsequent use cycle (e.g., the following day (e.g., a Tuesday)), the history of usage indicates that the user typically does not begin the next charging cycle before the energy storage component is discharged by 90% (e.g., because the user works longer days on Tuesdays than on Mondays), then the first set of one or more charging criteria is not met and/or the second set of one or more charging criteria are met for the subsequent use cycle and the computer system is configured to charge the energy storage component to the second charging level (e.g., 100%) to avoid the likelihood that the energy storage component will be fully discharged prior to the next charging cycle. In some embodiments, the usage history indicates a high degree of variance in the usage pattern for at least the next use cycle (e.g., the energy storage component is discharged between 5% and 95% on a given day of the week and/or all days of the week), resulting in the first set of one or more charging criteria not being met and the computer system being configured to charge to the second charging level to optimize the available stored energy for use. The second set of one or more charging criteria includes a first criterion that is based on a second set of history of usage of the computer system (e.g., usage by a user of the computer system and/or usage behavior of the user) over time. In some embodiments, the first and second set of history of usage are the same history of usage. In some embodiments, the computer system determines whether to configure to charge the energy storage component to the first charging level or the second charging level based on a usage history/usage pattern for the computer system (e.g., by a user). Basing the sets of charging criteria on histories of usage of the computer system makes the determination of whether to use the first or second charging levels empirically-driven, which can improve the accuracy and adaptability of the charging level determination for the particular computer system and the particular user. Doing so enhances the operational life of the computer system and helps to extend user-system interactions, which enables the user to use the system more often and over a longer period of time.

In some embodiments, on a first day, the computer system is configured to charge the energy storage component to the charging level; and on a second day, different than the first day, the computer system is configured to charge the energy storage component to a second charging level (e.g., as seen in FIGS. 7I and 7J). In some embodiments, the charge level can change between days (e.g., subsequent days). For example, the first set of one or more criteria includes a criterion that is based on a history of usage for the same day of the week, when determining the appropriate charging level for that same day of the week (e.g., usage patterns for Mondays are used to determine the charging level on Mondays), which can result in different charging levels on different days of the week. For example, the history of usage indicates that computer system is typically discharged less than 50% (in some embodiments, less than 50%, 30%, or 20%) prior to being re-charged on Mondays whereas the history of usage indicates that the computer system is typically discharged more than 50% (e.g., more than 70% or 90%) on Tuesdays prior to being re-charged (e.g., because the user has a history of working longer hours on Tuesdays than Mondays), resulting in the computer system being charged to the first charging level on Mondays and the second charging level on Tuesdays. Varying the charging level on different days allows the determination of whether to use the first or second charging levels to be more granularly customized for the particular computer system and the particular user. Doing so enhances the operational life of the computer system and helps to extend user-system interactions, which enables the user to use the system more often and over a longer period of time.

In some embodiments, while the computer system is configured to charge the energy storage component to the first charging level and while displaying the charge status indicator with the first end charge indication, the computer system receives a first input (e.g., 711*b*) (e.g., via an input device (e.g., a touch-sensitive surface or a hardware button) directed to the charge status indicator with the first end charge indication. In response to receiving the first input, initiate a process for configuring the computer system to change the energy storage component to a fourth charging level, higher than the first charging level (e.g., as described with reference to FIGS. 7D-7H) (e.g., initiating charging the computer system to the fourth charging level and/or displaying a first selectable user interface object (e.g., an affordance) that, when selected, configures the computer system to charge the energy storage component to a fourth charging level (in some embodiments, the fourth charging level is the second charging level), higher than the first charging level). Providing the first selectable user interface object allows the user to modify the current set first charging level to a higher charging level, which provides the user with greater control over the charging of the energy storage component (e.g., when a greater need for energy before the next charging cycle is anticipated), which can improve the user-system interaction by extending the use of the computer system for the next use cycle.

In some embodiments, in response to receiving the first input, the computer system displays a first selectable user interface object (e.g., 715*a*) (e.g., an affordance) that, when selected, configures the computer system to charge the energy storage component to the fourth charging level (in some embodiments, the fourth charging level is the second charging level), higher than the first charging level; the computer system receives a second input directed to the first selectable user interface object. In response to receiving the second input: the computer system configures the computer system to charge the energy storage component to the fourth charging level; and the computer system displays the charge status indicator without the first end charge indication (in some embodiments, replacing display of the charge status indicator with the first end charge indication). Displaying the charge status indictor without the first end charge indication after the system is configured to charge above the first charging level provides feedback that the first charging level is no longer the set charging level, which provides improved visual feedback.

In some embodiments, the first set of one or more charging criteria includes a first criterion that is met when a first user-configurable setting (e.g., 727*a*) is not in a first mode (e.g., a mode where automatic switching to the first charging level is disabled).

In some embodiments, the computer system displays a user interface (e.g., 727) that includes a second selectable user interface object that corresponds to the first user-configurable setting (e.g., a setting affordance). While the first user-configurable setting is not in the first mode (e.g., not in the mode where automatic switching to the first charging level is disabled), the computer system receives a third input (e.g., 711*e*) (e.g., user input) corresponding to the second selectable user interface object (in some embodiments, a request to toggle the first-user configurable setting to the first mode); in response to receiving the third input (e.g., user input), the computer system displays a third selectable user interface object (e.g., 729*a*) that, when selected, sets the first user-configurable setting to the first mode for a predetermined period of time (e.g., a period of time until the next morning, 1 day, or 1 week). Displaying the third selectable user interface object when the user requests to switch the first-user configurable setting to the first mode provides the user with an option to only change the mode for the predetermined period of time, which can limit the amount of time during which the computer system will not, based on the sets of charging criteria, set the charging level to the lower first charging level. Doing so enhances the operational life of the computer system and helps to extend user-system interactions, which enables the user to use the system more often and over a longer period of time, while still providing the user with the agency to temporally override the feature.

In some embodiments, the computer system receives a fourth input (e.g., 711*f*) (e.g., user input) corresponding to the third selectable user interface object; in response to the fourth input (e.g., user input), the computer system sets the first user-configurable setting to the first mode for the predetermined period of time; and while the first user-configurable setting is set to the first mode, the computer system displays, in a settings user interface (e.g., 727 of FIG. 7M), an indication (e.g., 727*d*) (e.g., a textual indication and/or a graphical indication) that the first user-configurable setting is set to the first mode. Displaying the indication that the first user-configurable setting is set to the first mode provides the user greater feedback about the state of the computer system with respect to its capability to configure the energy storage component to charge to the lower first level, based on the first set of charging criteria, which provides improved visual feedback.

In some embodiments, in response to receiving the third input (e.g., user input), the computer system displays (in some embodiments, concurrently with the third selectable user interface object) a fourth selectable user interface object (e.g., 729*b*) that, when selected, sets the first user-configurable setting to the first mode (e.g., for an indefinite period of time (e.g., until the user provides a subsequent input to disable the first mode)).

In some embodiments, the computer system receives a fifth input (e.g., as described with reference to 729*b*) (e.g., user input) corresponding to the fourth selectable user interface object; and in response to receiving the fifth input (e.g., user input), the computer system sets the first user-configurable setting to the first mode. While the first user-configurable setting is set to the first mode and in accordance with a determination that set of one or more prompting criteria (in some embodiments, the set of one or more prompting criteria includes a criterion that is met when the usage history for the computer system and/or a user of the computer indicates that configuring the computer system to charge the energy storage component to the first charging level is recommended (e.g., recommended to optimize the operational life of the energy storage component) are met, the computer system displays a first prompt (e.g., 731) to set the first user-configurable setting to a mode other than the first mode (e.g., a second mode in which automatically configuring the computer system to charge the energy storage component to the first charging level is enabled). In some embodiments, the first prompt includes a selectable user interface object that, when selected, sets the first user-configurable setting to the second mode. Displaying a prompt to set the user-configurable setting to a mode other than the first mode, when the setting is in the first mode, reminds the user that the setting is in the first mode so as to prompt the user to change the setting to the mode other than the first mode, which can limit the amount of time during which the computer system will not, based on the sets of charging criteria, set the charging level to the lower first charging level. Doing so enhances the operational life of the computer system and helps to extend user-system interactions, which enables the user to use the system more often and over a longer period of time, while still providing the user with the agency to override the feature.

In some embodiments, while the computer system is connected to an external power source and during a first charging operation (e.g., charging cycle) for the energy storage component: in accordance with a determination that the computer system is configured to charge the energy storage component to the second charging level: the computer system charges the energy storage component to the first charging level and then pausing (e.g., pausing for a predetermined period of time) further charging of the energy storage component (e.g., while the charging operation is still ongoing); and after charging the energy storage component to the first charging level and then pausing further charging of the energy storage component and in accordance with a determination that a set of one or more charging continuation criteria are met, the computer system continues to charge the energy storage component to the second charging level and then ending the first charging operation (e.g., as seen in 606); in accordance with a determination that the computer system is configured to charge the energy storage component to the first charging level, the computer system the energy storage component to the first charging level and then ending the first charging operation (e.g., as seen in 604) (in some embodiments, regardless of whether the charging continuation criteria are met). Pausing further charging of the storage component after charging to the first charging level and then continuing to charge the component to the second level, after the pause, helps to extend the operational life of the energy storage component by not holding the component at a higher charge level during a period of time when the higher level of charge is not needed. Doing so enhances the operational life of the computer system and helps to extend user-system interactions, which enables the user to use the system more often and over a longer period of time.

In some embodiments, the set of one or more charging continuation criteria includes a criterion that is met when a determination is made that a current time is within a second predetermined period of time before a predicted use event for the computer system (e.g., as seen in FIG. 7J) (e.g., the current time is within 2 hours, 1 hour, or 30 minutes (in some embodiments, an amount of time that is required to charge the energy storage component from the first charging level to the second charging level) of a predicted time at which the user will begin to use the computer system). In some embodiments, the predicted use event is determined based on a set of history of usage and/or pattern of usage of the computer system (e.g., usage by a user of the computer system and/or usage behavior of the user) by picking different times to continue charging based on when the user is predicted to start using the computer system. For example, if the usage history indicates that the user routinely begins to use the computer system at 8 AM in the morning, the computer system resumes charging of the computer system, from the first charging level to the second charging level, at 6 AM. For example, if the usage history indicates that the user routinely begins to use the computer system at 9 AM in the morning, the computer system resumes charging of the computer system, from the first charging level to the second charging level, at 7 AM. Basing the duration of the charging pause on a predicted use event helps to extend the operational life of the energy storage component by not holding the component at a higher charge level during a period of time when the higher level of charge is not needed, while also having it at the higher charge level in advance of the predicted use event. Doing so enhances the operational life of the computer system and helps to extend user-system interactions, which enables the user to use the system more often and over a longer period of time.

In some embodiments, during a configuration process for the computer system (e.g., an initial setup process), the computer system displays a first indication that the computer system can be configured to charge to the first charging level or the second charging level (e.g., as seen in FIGS. 7A and 7K) (e.g., based on whether the first set of one or more charging criteria are met or the second set of one or more charging criteria are met). Displaying the first indication that the computer system can be configured to charge to the first charging level or the second charging level improves the user's awareness of these features, which provides improved visual feedback. Doing so also provides the user with information that enables the user to change the configuration of the computer system more quickly and efficiently which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system determines that a set of one or more initial use criteria are met; In some embodiments, the initial use criteria are met when the computer system is operated/used for the first time (e.g., a first time after a software update; a first time after completing an initial configuration process; or a first time after a reset event). In response to determining that the set of one or more initial use criteria are met, the computer system displays a second indication (e.g., 709*a*) that the computer system can be configured to charge to the first charging level or the second charging level (e.g., based on whether the first set of one or more charging criteria are met or the second set of one or more charging criteria are met). Displaying the second indication that the computer system can be configured to charge to the first charging level or the second charging level improves the user's awareness of these features, which provides improved visual feedback. Doing so also provides the user with information that enables the user to change the configuration of the computer system more quickly and efficiently which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays a representation of at least a portion of a charging history (e.g., 725*a*) of the energy storage component over a first period of time (e.g., the preceding day, the preceding week, the preceding charge cycle/charging event) that includes a second charging operation, wherein displaying the charging history of the energy storage component over the first period of time includes: in accordance with a determination that charging of the energy component was stopped, thereby ending the second charging operation, the computer system displays a third indication (e.g., 725*a*2) of when charging of the energy storage component was stopped and when the second charging operation was ended (e.g., stopped by the computer system; ended for the respective charging operation/charging cycle (e.g., stopped at the first charging level or the second charging level)). Displaying the representation of the charging history with the third indication provides the user with information about when charging was stopped, which provides improved visual feedback.

In some embodiments, displaying the portion of the charging history of the energy storage component over the first period of time includes: in accordance with a determination that charging of the energy component was paused prior to being resumed during the second charging operation (e.g., during the first time period), the computer system displays a fourth indication (e.g., 725$d$2) of when charging of the energy storage component was paused during the second charging operation, wherein the fourth indication has a visual appearance different than a visual appearance of the third indication. Displaying the representation of the charging history with the fourth indication provides the user with information about when charging was paused, which provides improved visual feedback.

In some embodiments, the computer system is in communication with an external computer system (e.g., 700); and the computer system provides information to the external computer system that enables the external computer system to display a charging indicator (e.g., 710$a$2) for the computer system (e.g., via a display generation component of the external computer system) (e.g., as part of a battery widget and/or a user interface of a battery application or an application for configuring the computer system via the external computer system). In accordance with a determination that the first set of one or more charging criteria, the charging indicator for the computer system includes the charge status indicator with the first end charge indication; and in accordance with a determination that the first set of one or more charging criteria, the charging indicator for the computer system includes the charge status indicator without the first end charge indication (e.g., as described with reference to FIG. 7O). In some embodiments, the computer system is in a paired relationship with the external computer system (e.g., the two systems maintain a mutual link in which data (e.g., configuration data, user data, energy storage component data) is exchanged between the two systems)). For example, the computer system is a smart watch and the external computer system is a smart phone, both of which are associated with the same user, with the paired watch and phone exchanging data, such as current energy storage capacity as well as user data. In some embodiments, the computer system is a set of wireless headphones, an input device (e.g., a wireless mouse or stylus), or a tablet computer and the external computer system is a personal computer (e.g., a laptop or desktop). Displaying the charge status indicator with or without the first end charge indication, depending on the sets of charging criteria, provides the user with information on the external computer system of the charging configuration of the computer system, which provides improved visual feedback. Doing so also allows the user to see this information without having to activate the computer system (e.g., from a low power state and/or a display off state) which reduces power usage and improves battery life of the computer system.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve managing charging of devices. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine usage patterns to better improve adaptive charging of devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of adaptive charging of devices, the present technology can be configured to allow users to select to "opt in" or "opt out" of participation in the collection of personal information data during registration for services or anytime thereafter. In another example, users can select not to provide and/or to store later device usage data. In yet another example, users can select to limit the length of time usage data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, usage patterns can be selected and delivered to users by inferring usage based on non-personal information data or a bare minimum amount of personal information, such as the content being requested by the device associated with a user, other non-personal information available to usage pattern predictions services, or publicly available information.

What is claimed is:

1. A computer system with an energy storage component and that is configured to communicate with a display generation component, the computer system comprising:

one or more processors; and memory storing one or more programs configured to be executed by the one or more processors, the one or more programs including instructions for:

displaying a user interface that includes a charge status indicator, wherein:

the charge status indicator indicates a current level of charge of the energy storage component;

in accordance with a determination that a first set of one or more charging criteria are met:

the computer system is configured to charge the energy storage component to a first charging level and to end charging when the first charging level is reached; and the charge status indicator is displayed with a first end charge indication that indicates that charging of the energy storage component will end before the energy storage component is charged above the first charging level; and in accordance with a determination that a second set of one or more charging criteria are met:

the computer system is configured to charge the energy storage component to a second charging level that is higher than the first charging level; and the charge status indicator is displayed without the first end charge indication.

2. The computer system of claim 1, wherein displaying the user interface that includes the charge status indicator occurs while the energy storage component is at third charging level that is lower than the first charging level.

3. The computer system of claim 1, wherein the first end charge indication is displayed at a first location along a path corresponding to the charge status indicator.

4. The computer system of claim 3, wherein the first location is partway along the path corresponding to the charge status indicator and the first end charge indication extends at an angle from the path corresponding to the charge status indicator.

5. The computer system of claim 3, wherein the first end charge indication includes a plurality of non-contiguous elements that extend along the path corresponding to the charge status indicator at the first location.

6. The computer system of claim 3, wherein the first end charge indication includes a first non-contiguous element at the first location.

7. The computer system of claim 3, wherein the first end charge indication is an absence of a respective sub-portion of the charge status indicator that is visible when the energy storage component is charged above the first charging level.

8. The computer system of claim 1, wherein:

the charge status indicator, when displayed without the first end charge indication, includes a first sub-portion; and the charge status indicator, when displayed with the first end charge indication, does not include the first sub-portion.

9. The computer system of claim 1, wherein the charge status indicator is displayed with the first end charge indication while the computer system is connected to an external power source that is actively charging the energy storage component.

10. The computer system of claim 1, wherein the charge status indicator is displayed with the first end charge indication while the energy storage component is not being actively charged.

11. The computer system of claim 1, wherein:

the charge status indicator includes a second sub-portion that corresponds to a first portion of a capacity of the energy storage component that is below the first charging level;

the charge status indicator includes a third sub-portion that corresponds to a second portion of the capacity of the energy storage component that is above the first charging level;

displaying the charge status indicator without the first end charge indication includes displaying the third sub-portion of the charge status indicator with a first visual appearance; and displaying the charge status indicator with the first end charge indication includes displaying the third sub-portion of the charge status indicator with a second visual appearance, different from the first visual appearance.

12. The computer system of claim 1, wherein:

the charge status indicator is a path where an end of the path is at or near a beginning of the path;

a first portion of the path corresponds to a third portion of a capacity of the energy storage component that is below the first charging level;

a second portion of the path that corresponds to a fourth portion of the capacity of the energy storage component that is above the first charging level;

a first end of the second portion of the path corresponds to a maximum current charging capacity of the energy storage component; and the first end charge indication, when displayed, is displayed at a first end of the first portion of the path that corresponds to the first charging level.

13. The computer system of claim 1, wherein:

the determination that the first set of one or more charging criteria are met is a determination made by the computer system; and the determination that the second set of one or more charging criteria are met is a determination made by the computer system.

14. The computer system of claim 13, wherein:

the first set of one or more charging criteria includes a first criterion that is based on a first set of history of usage of the computer system over time; and the second set of one or more charging criteria includes a first criterion that is based on a second set of history of usage of the computer system over time.

15. The computer system of claim 13, wherein:

on a first day, the computer system is configured to charge the energy storage component to the first charging level; and on a second day, different than the first day, the computer system is configured to charge the energy storage component to the second charging level.

16. The computer system of claim 1, the one or more programs further including instructions for:

while the computer system is configured to charge the energy storage component to the first charging level and while displaying the charge status indicator with the first end charge indication, receiving a first input directed to the charge status indicator with the first end charge indication; and in response to receiving the first input, initiating a process for configuring the computer system to change the energy storage component to a fourth charging level, higher than the first charging level.

17. The computer system of claim 16, the one or more programs further including instructions for:

in response to receiving the first input, displaying a first selectable user interface object that, when selected, configures the computer system to charge the energy storage component to the fourth charging level, higher than the first charging level;

receiving a second input directed to the first selectable user interface object; and in response to receiving the second input:

configuring the computer system to charge the energy storage component to the fourth charging level; and displaying the charge status indicator without the first end charge indication.

18. The computer system of claim 1, wherein the first set of one or more charging criteria includes a first criterion that is met when a first user-configurable setting is not in a first mode.

19. The computer system of claim 18, the one or more programs further including instructions for:

displaying a user interface that includes a second selectable user interface object that corresponds to the first user-configurable setting;

while the first user-configurable setting is not in the first mode, receiving a third input corresponding to the second selectable user interface object; and in response to receiving the third input, displaying a third selectable user interface object that, when selected, sets the first user-configurable setting to the first mode for a predetermined period of time.

20. The computer system of claim 19, the one or more programs further including instructions for:

receiving a fourth input corresponding to the third selectable user interface object;

in response to the fourth input, setting the first user-configurable setting to the first mode for the predetermined period of time; and while the first user-configurable setting is set to the first mode, displaying, in a settings user interface, an indication that the first user-configurable setting is set to the first mode.

21. The computer system of claim 19, the one or more programs further including instructions for:

in response to receiving the third input, displaying a fourth selectable user interface object that, when selected, sets the first user-configurable setting to the first mode.

22. The computer system of claim 21, the one or more programs further including instructions for:

receiving a fifth input corresponding to the fourth selectable user interface object;

in response to receiving the fifth input, setting the first user-configurable setting to the first mode; and while the first user-configurable setting is set to the first mode and in accordance with a determination that set of one or more prompting criteria are met, displaying a first prompt to set the first user-configurable setting to a mode other than the first mode.

23. The computer system of claim 1, the one or more programs further including instructions for:

while the computer system is connected to an external power source and during a first charging operation for the energy storage component:

in accordance with a determination that the computer system is configured to charge the energy storage component to the second charging level:

charging the energy storage component to the first charging level and then pausing further charging of the energy storage component; and after charging the energy storage component to the first charging level and then pausing further charging of the energy storage component and in accordance with a determination that a set of one or more charging continuation criteria are met, continuing to charge the energy storage component to the second charging level and then ending the first charging operation; and in accordance with a determination that the computer system is configured to charge the energy storage component to the first charging level, charging the energy storage component to the first charging level and then ending the first charging operation.

24. The computer system of claim 23, wherein the set of one or more charging continuation criteria includes a criterion that is met when a determination is made that a current time is within a second predetermined period of time before a predicted use event for the computer system.

25. The computer system of claim 1, the one or more programs further including instructions for:

during a configuration process for the computer system, displaying a first indication that the computer system can be configured to charge to the first charging level or the second charging level.

26. The computer system of claim 1, the one or more programs further including instructions for:

determining that a set of one or more initial use criteria are met; and in response to determining that the set of one or more initial use criteria are met, displaying a second indication that the computer system can be configured to charge to the first charging level or the second charging level.

27. The computer system of claim 1, the one or more programs further including instructions for:

displaying a representation of at least a portion of a charging history of the energy storage component over a first period of time that includes a second charging operation, wherein displaying the charging history of the energy storage component over the first period of time includes:

in accordance with a determination that charging of the energy storage component was stopped, ending the second charging operation, displaying a third indication of when charging of the energy storage component was stopped and when the second charging operation was ended.

28. The computer system of claim 27, wherein displaying the portion of the charging history of the energy storage component over the first period of time includes:

in accordance with a determination that charging of the energy storage component was paused prior to being resumed during the second charging operation, displaying a fourth indication of when charging of the energy storage component was paused during the second charging operation, wherein the fourth indication has a visual appearance different than a visual appearance of the third indication.

29. The computer system of claim 1, wherein:

the computer system is in communication with an external computer system; and the computer system provides information to the external computer system that enables the external computer system to display a charging indicator for the computer system, wherein:

in accordance with a determination that the first set of one or more charging criteria, the charging indicator for the computer system includes the charge status indicator with the first end charge indication; and in accordance with a determination that the first set of one or more charging criteria, the charging indicator for the computer system includes the charge status indicator without the first end charge indication.

30. A non-transitory computer-readable storage medium storing one or more programs configured to be executed by one or more processors of a computer system with an energy storage component and that is in communication with a display generation component, the one or more programs including instructions for:

displaying a user interface that includes a charge status indicator, wherein:

the charge status indicator indicates a current level of charge of the energy storage component;

in accordance with a determination that a first set of one or more charging criteria are met:

the computer system is configured to charge the energy storage component to a first charging level and to end when the first charging level is reached; and the charge status indicator is displayed with a first end charge indication that indicates that charging of the energy storage component will end before the energy storage component is charged above the first charging level; and in accordance with a determination that a second set of one or more charging criteria are met:

the computer system is configured to charge the energy storage component to a second charging level that is higher than the first charging level; and the charge status indicator is displayed without the first end charge indication.

31. A method comprising:

at a computer system with an energy storage component and that is in communication with a display generation component:

displaying a user interface that includes a charge status indicator, wherein:

the charge status indicator indicates a current level of charge of the energy storage component;

in accordance with a determination that a first set of one or more charging criteria are met:

the computer system is configured to charge the energy storage component to a first charging level and to end charging when the first charging level is reached; and the charge status indicator is displayed with a first end charge indication that indicates that charging of the energy storage component will end before the energy storage component is charged above the first charging level; and in accordance with a determination that a second set of one or more charging criteria are met:

the computer system is configured to charge the energy storage component to a second charging level that is higher than the first charging level; and the charge status indicator is displayed without the first end charge indication.

32. The non-transitory computer-readable storage medium of claim 30, wherein displaying the user interface that includes the charge status indicator occurs while the energy storage component is at third charging level that is lower than the first charging level.

33. The non-transitory computer-readable storage medium of claim 30, wherein the first end charge indication is displayed at a first location along a path corresponding to the charge status indicator.

34. The non-transitory computer-readable storage medium of claim 30, wherein:

the charge status indicator, when displayed without the first end charge indication, includes a first sub-portion; and the charge status indicator, when displayed with the first end charge indication, does not include the first sub-portion.

35. The non-transitory computer-readable storage medium of claim 30, wherein the charge status indicator is displayed with the first end charge indication while the computer system is connected to an external power source that is actively charging the energy storage component.

36. The non-transitory computer-readable storage medium of claim 30, wherein the charge status indicator is displayed with the first end charge indication while the energy storage component is not being actively charged.

37. The non-transitory computer-readable storage medium of claim 30, wherein:

the charge status indicator includes a second sub-portion that corresponds to a first portion of a capacity of the energy storage component that is below the first charging level;

the charge status indicator includes a third sub-portion that corresponds to a second portion of the capacity of the energy storage component that is above the first charging level;

displaying the charge status indicator without the first end charge indication includes displaying the third sub-portion of the charge status indicator with a first visual appearance; and displaying the charge status indicator with the first end charge indication includes displaying the third sub-portion of the charge status indicator with a second visual appearance, different from the first visual appearance.

38. The non-transitory computer-readable storage medium of claim 30, wherein:

the charge status indicator is a path where an end of the path is at or near a beginning of the path;

a first portion of the path corresponds to a third portion of a capacity of the energy storage component that is below the first charging level;

a second portion of the path that corresponds to a fourth portion of the capacity of the energy storage component that is above the first charging level;

a first end of the second portion of the path corresponds to a maximum current charging capacity of the energy storage component; and the first end charge indication, when displayed, is displayed at a first end of the first portion of the path that corresponds to the first charging level.

39. The non-transitory computer-readable storage medium of claim 30, wherein:

the determination that the first set of one or more charging criteria are met is a determination made by the computer system; and the determination that the second set of one or more charging criteria are met is a determination made by the computer system.

40. The non-transitory computer-readable storage medium of claim 39, wherein:

the first set of one or more charging criteria includes a first criterion that is based on a first set of history of usage of the computer system over time; and the second set of one or more charging criteria includes a first criterion that is based on a second set of history of usage of the computer system over time.

41. The non-transitory computer-readable storage medium of claim 39, wherein:

on a first day, the computer system is configured to charge the energy storage component to the first charging level; and on a second day, different than the first day, the computer system is configured to charge the energy storage component to the second charging level.

42. The non-transitory computer-readable storage medium of claim 30, the one or more programs further including instructions for:

while the computer system is configured to charge the energy storage component to the first charging level and while displaying the charge status indicator with the first end charge indication, receiving a first input directed to the charge status indicator with the first end charge indication; and in response to receiving the first input, initiating a process for configuring the computer system to change the energy storage component to a fourth charging level, higher than the first charging level.

43. The non-transitory computer-readable storage medium of claim 30, the one or more programs further including instructions for:

while the computer system is connected to an external power source and during a first charging operation for the energy storage component:

in accordance with a determination that the computer system is configured to charge the energy storage component to the second charging level:

charging the energy storage component to the first charging level and then pausing further charging of the energy storage component; and after charging the energy storage component to the first charging level and then pausing further charging of the energy storage component and in accordance with a determination that a set of one or more charging continuation criteria are met, continuing to charge the energy storage component to the second charging level and then ending the first charging operation; and in accordance with a determination that the computer system is configured to charge the energy storage component to the first charging level, charging the energy storage component to the first charging level and then ending the first charging operation.

44. The method of claim 31, wherein displaying the user interface that includes the charge status indicator occurs while the energy storage component is at third charging level that is lower than the first charging level.

45. The method of claim 31, wherein the first end charge indication is displayed at a first location along a path corresponding to the charge status indicator.

46. The method of claim 31, wherein:

the charge status indicator, when displayed without the first end charge indication, includes a first sub-portion; and the charge status indicator, when displayed with the first end charge indication, does not include the first sub-portion.

47. The method of claim 31, wherein the charge status indicator is displayed with the first end charge indication while the computer system is connected to an external power source that is actively charging the energy storage component.

48. The method of claim 31, wherein the charge status indicator is displayed with the first end charge indication while the energy storage component is not being actively charged.

49. The method of claim 31, wherein:

the charge status indicator includes a second sub-portion that corresponds to a first portion of a capacity of the energy storage component that is below the first charging level;

the charge status indicator includes a third sub-portion that corresponds to a second portion of the capacity of the energy storage component that is above the first charging level;

displaying the charge status indicator without the first end charge indication includes displaying the third subportion of the charge status indicator with a first visual appearance; and displaying the charge status indicator with the first end charge indication includes displaying the third subportion of the charge status indicator with a second visual appearance, different from the first visual appearance.

50. The method of claim 31, wherein:

the charge status indicator is a path where an end of the path is at or near a beginning of the path;

a first portion of the path corresponds to a third portion of a capacity of the energy storage component that is below the first charging level;

a second portion of the path that corresponds to a fourth portion of the capacity of the energy storage component that is above the first charging level;

a first end of the second portion of the path corresponds to a maximum current charging capacity of the energy storage component; and the first end charge indication, when displayed, is displayed at a first end of the first portion of the path that corresponds to the first charging level.

51. The method of claim 31, wherein:

the determination that the first set of one or more charging criteria are met is a determination made by the computer system; and the determination that the second set of one or more charging criteria are met is a determination made by the computer system.

52. The method of claim 51, wherein:

the first set of one or more charging criteria includes a first criterion that is based on a first set of history of usage of the computer system over time; and the second set of one or more charging criteria includes a first criterion that is based on a second set of history of usage of the computer system over time.

53. The method of claim 51, wherein:

on a first day, the computer system is configured to charge the energy storage component to the first charging level; and on a second day, different than the first day, the computer system is configured to charge the energy storage component to the second charging level.

54. The method of claim 31, further comprising:

while the computer system is configured to charge the energy storage component to the first charging level and while displaying the charge status indicator with the first end charge indication, receiving a first input directed to the charge status indicator with the first end charge indication; and in response to receiving the first input, initiating a process for configuring the computer system to change the energy storage component to a fourth charging level, higher than the first charging level.

55. The method of claim 31, further comprising:

while the computer system is connected to an external power source and during a first charging operation for the energy storage component:

in accordance with a determination that the computer system is configured to charge the energy storage component to the second charging level:

charging the energy storage component to the first charging level and then pausing further charging of the energy storage component; and after charging the energy storage component to the first charging level and then pausing further charging of the energy storage component and in accordance with a determination that a set of one or more charging continuation criteria are met, continuing to charge the energy storage component to the second charging level and then ending the first charging operation; and in accordance with a determination that the computer system is configured to charge the energy storage component to the first charging level, charging the energy storage component to the first charging level and then ending the first charging operation.

* * * * *